(12) United States Patent
De Bonet

(10) Patent No.: US 6,535,642 B1
(45) Date of Patent: Mar. 18, 2003

(54) APPROXIMATE STRING MATCHING SYSTEM AND PROCESS FOR LOSSLESS DATA COMPRESSION

(75) Inventor: Jeremy S. De Bonet, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/353,303

(22) Filed: Jul. 13, 1999

(51) Int. Cl.[7] .................................................. G06K 9/36
(52) U.S. Cl. ...................................... 382/232; 382/236
(58) Field of Search ................................. 382/232, 233, 382/234, 235, 236, 237, 244, 245, 246, 248, 250; 345/501; 375/240.12

(56) References Cited

U.S. PATENT DOCUMENTS

| | | | | |
|---|---|---|---|---|
| 5,267,334 A | * | 11/1993 | Normille et al. | ........ 375/240.12 |
| 5,650,941 A | * | 7/1997 | Coelho et al. | ............... 345/501 |
| 5,841,938 A | * | 11/1998 | Nitta et al. | .................. 386/111 |
| 6,021,224 A | * | 2/2000 | Castelli et al. | ............... 382/232 |
| 6,125,212 A | * | 9/2000 | Kresch et al. | ............... 382/248 |

OTHER PUBLICATIONS

A. Lempel and J. Ziv. On the complexity of finite sequences. IEEE Transactions on Information Theory, vol. IT–22, 1976, pp. 75–81.

J. Ziv and A. Lempel. A universal algorithm for sequential data compression. IEEE Transactions on Information Theory, vol. IT–23, No. 3, May 1977, pp. 337–343.

T. A. Welch. A technique for high performance data compression. IEEE Computer, 17(6), Jun. 1984, pp. 8–19.

J. G. Cleary and I. H. Witten. Data compression using adaptive coding and partial string matching. IEEE Transactions. on Communications, 32(4):396–402 Apr. 1984.

A. Moffat. Implementing the PPM data compression scheme. IEEE Transactions on Communications, 38(11):1917–1921, Nov. 1990.

* cited by examiner

*Primary Examiner*—Andrew W. Johns
*Assistant Examiner*—Duy M. Dang
(74) *Attorney, Agent, or Firm*—Lyon & Harr, LLP; Richard T. Lyon

(57) ABSTRACT

A system and process for lossless data compression employing a unique approximate string matching scheme. The encoder of the system characterizes source data as a set of pointers and associated blocks of residual data. Each pointer identifies a location earlier in the source data, as well as the number of source data values associated with the identified location. The residual data represents the difference between each value of an earlier occurring block of source data, whose location and length is identified by a pointer, and an equal-sized block of source data associated with the pointer. The choice of a block of earlier occurring source data for use in forming a residual data block is based on a cost analysis which is designed to minimize the entropy of the differences between the previous block and the new block of source data to a desired degree. The encoded data, which will exhibit a significantly lower entropy, can be compressed effectively using an entropy-based compression technique. The decoder portion of the system operates by initially decompressing the encoded data. Next, the first data value is decoded by adding the first residual to a predetermined constant. Once the first data value has been decoded, subsequent data values are decoded by first finding the block in the previously decoded data indicated by a pointer, and then adding each data value in the block to its corresponding data element in the residual data block associated with the pointer. The process is repeated until all the data is decoded.

78 Claims, 17 Drawing Sheets

DECODING THE
FIRST DATA VALUE

APPROXIMATE STRING MATCHING SYSTEM AND PROCESS FOR LOSSLESS DATA COMPRESSION

BACKGROUND

1. Technical Field

The invention is related to a computer-implemented data compression system and process, and more particularly, to a lossless data compression system and process that employs a unique approximate string matching scheme.

2. Background Art

Lossless compression of signals is often of critical importance. Because of storage limitations—e.g. hard drive size—or bandwidth limitations—e.g. modem speed—the need for compression is often necessary. For many applications, the signal of interest must be compressed losslessly. For example, text or computer programs would be worthless if the retrieved data is not identical to the transmitted (or stored) data. Existing methods do well on this type of data. However, there are other types of data which current methods do very poorly on, but which need to be compressed losslessly. For example, certain types of image signals are both very large (and therefore in need of compression) and contain sensitive details. Examples of such signals include medical (e.g. MRI, X-ray, CT) or Synthetic Aperture Radar (SAR) images, where distortion due to lossy compression could result in missing critical features (e.g. tumors or enemy tanks), and images whose usage requires the maximum possible quality (e.g. images for magazine covers, frames for movies). Other such data signals include sounds sources (e.g. music or speech) or echo recordings (e.g. from geological surveys such as earthquake or oil-finding).

Simple lossless compression is typically performed by entropy coding (examples of such techniques are Huffman or arithmetic coding). In this case a special code is designed which maps symbols in the source to symbols which are transmitted (or stored). An entropy code uses a small number of bits for common symbols in the source, at the expense of using long codes for infrequent symbols.

Current lossless compression schemes take advantage of repeating strings of symbols within a source. For example, the combination of symbols "t", "h" and "e", occurs very frequently in English text. These schemes take advantage of this redundancy by decreasing the cost of transmitting or storing such common sequences. Examples of such schemes are the Lempel-Ziv family of source codes, including LZ77, LZ78, LZW and derivatives [LZ76, ZL77, Wel84], as well as the Prediction by Partial Matching (PPM) algorithm [CW84, Mof 90]. LZW is used as the foundation for the PkZip, gzip and WinZip products. LZ77 is used in the CompuServe Graphics Interchange Format (GIF) image format. The PPM algorithm (specifically the PPM* algorithm) are generally considered to be at or near the state-of-the-art in the compression of text sources. Both LZ and PPM are so-called universal compression schemes, which means that in the limit they will converge to the maximum amount of compress possible. However, this is only true in the limit—in the case of an infinite amount of data. In practice we are always dealing with finite amounts of data, so the rate of convergence is of critical importance.

However, these existing lossless data compression schemes do not work well when the source alphabet is large, as in the case of sound, images, and other natural signals. They fail because they cannot exploit the redundancy in these signals. This is because in such signals, strings will rarely repeat exactly. As a result, the convergence of these algorithms to optimal compression is very slow. For realistic sources, even large sources on the order of terabytes, these algorithms will fail to reach compression levels near the theoretical optimum.

In natural signals, while data strings will rarely repeat exactly, they will often repeat approximately. For example, in images, a row is often very similar to the row above it. However, it is rarely exactly the same, due to lighting and structural variations. Even in the case of a uniform object with uniform lighting, long repeating strings of pixel values are extremely uncommon due to the noise in the image capturing process. Even a slight variation in the sequence of pixels will prevent the LZ and PPM algorithms from finding and exploiting the underlying redundancy. For example, consider two rows of pixels from a black and white image shown in the following table:

TABLE 1

| 1 | 12 | 4 | 123 | 243 | 253 | 143 | 10 | 3 | 2 |
|---|----|---|-----|-----|-----|-----|----|---|---|
| 6 | 3  | 1 | 130 | 252 | 250 | 126 | 7  | 7 | 2 |

Such an array of pixels might arise from an image of a white stripe on a dark background. Using the LZ algorithm or the PPM algorithm on these pixels will result in no compression at all.

Thus, while current lossless data compression methods work well for data characterized by strings that repeat exactly, efforts continue to find a method that can effectively compress data that lacks these identically matching data strings.

It is noted that in the preceding paragraphs the description refers to various publications identified by alphanumeric designators contained within a pair of brackets, e.g. [LZ76, ZL77, Wel84]. A listing of the publications corresponding to each designator can be found at the end of the Detailed Description section.

SUMMARY

The present invention is directed at a lossless data compression system and process that employs a unique approximate string matching scheme to overcome the problems associated with current compression methods. This system and process includes both an encoder and a decoder.

Generally, the encoding portion of this system and process entails identifying mutually exclusive blocks of data values within the source data being encoded that have lengths, which when represented with the pointer-residual approach described below, exhibit the lowest overall cost for transmitting or storing the source data. These data blocks are referred to as optimal blocks. A block of earlier occurring source data is also identified for each optimal block. These earlier occurring blocks are chosen so that when compared to the optimal block, their difference exhibits the lowest possible entropy. The optimal blocks and their associated blocks of earlier occurring data values are used to generate residual data. This residual data is made up of blocks of data values formed by taking the difference between the values in each corresponding data location of each optimal block and its associated block of earlier occurring source data, starting with the first data location of both blocks. The choice of a block of earlier occurring source data for use in forming a residual data block is based on a cost analysis which is designed to minimize the entropy of differences between the previous block and the new block of source data—at least to a desired degree. The purpose of this difference minimization process is to create blocks of residual data having a highly kurtotic distribution so that most of the data is centered around zero. This distribution makes the block of residual data amenable to commonly used entropy-based compression techniques, such as Huffman, Shannon-Fano, or even higher order techniques such as LZ77, LZW and their derivatives, or PPM. In addition to the residual data, a series of pointers are generated. Each pointer is initially affiliated with a separate one of the optimal blocks and identifies the location and length of the block of earlier occurring source data associated with this optimal block. Preferably, prior to compressing the encoded data, each pointer is assigned to the residual data location that corresponds to the location of the first data value of the optimal block to which the pointer was affiliated. The residual data is then compressed using any appropriate entropy-based compression technique, such as those mentioned above. If desired, the pointers can also be compressed using similar techniques at this point in the process. Finally, the compressed residual data and pointers are combined to form a compressed code capable of being transmitted or stored.

The decoding portion of the system and process generally entails, first decompressing the residual data and the pointer (if applicable) using an appropriate decoder for the particular compression technique used to compress the residual data, and then recovering the source data from the residual data and pointers. The process of recovering the source data begins by decoding the first data value from the residual data by adding the first value of the residual data to a predetermined constant. Preferably, this predetermined constant is a mean of the original source data values and was used to encode the first data valued during the encoding process (as will be described more fully in the detailed description section of this specification). The next step in the process is to select the first occurring pointer. In a preferred embodiment of the present invention, each pointer takes the form of an offset-count pair having an offset value defining the offset to an earlier occurring data location and a count value defining a number of data values in a block of data. A block of data values is identified in the previously decoded data by, first counting back through the decoded data from the last decoded data location by the number of locations indicated by the offset value of the currently selected offset-count pair (which in this first instant is the first occurring pair). The data location so identified represents the first data value of the block. The rest of the block is made up of the previously decoded data values immediately following the first value, up to a limit indicated by the count value of the currently selected offset-count pair. The decoding process continues with the identification of a block of residual values. This block is made up of those values associated with residual data locations starting at and following the residual data location to which the currently selected offset-count pair is assigned, up to a limit indicated by the count value of the currently selected pair. Thus, two blocks of data are identified. Namely, a block of residual values and an equal-sized block of earlier occurring, previously decoded data. The data values of the identified block of previously decoded data values is added in sequence to the correspondingly located values of the identified block of residual values, beginning with the first value in both blocks. The resulting sums are designated the next block of recovered source data. The currently selected offset-count pair is then deselected and replaced with the next occurring pair. The foregoing process is repeated for the newly selected offset-count pair until there are no more offset-count pairs to select. At that point all the source data would have been recovered.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
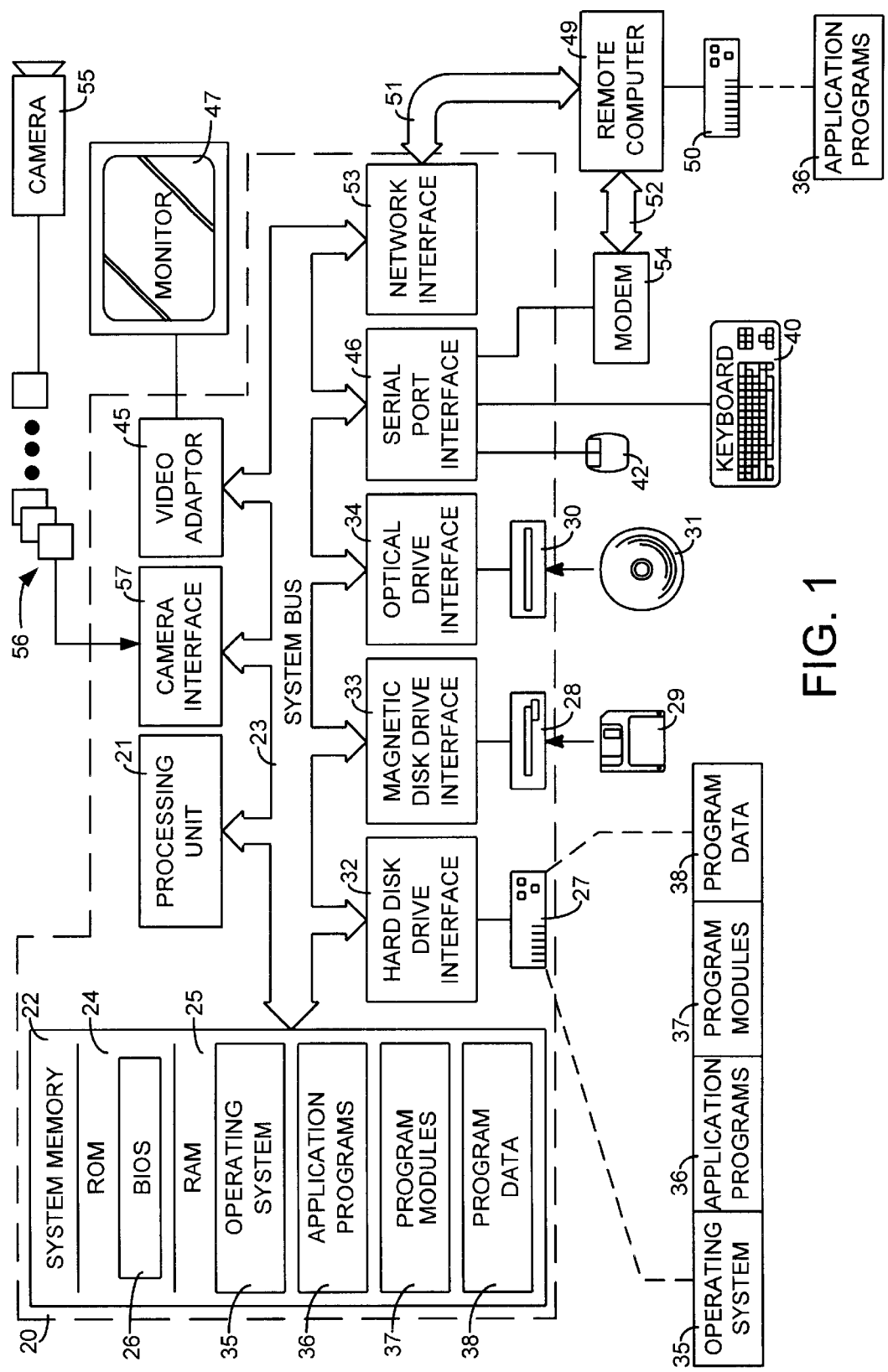
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the system and process embodying the present invention.

Figure 2:
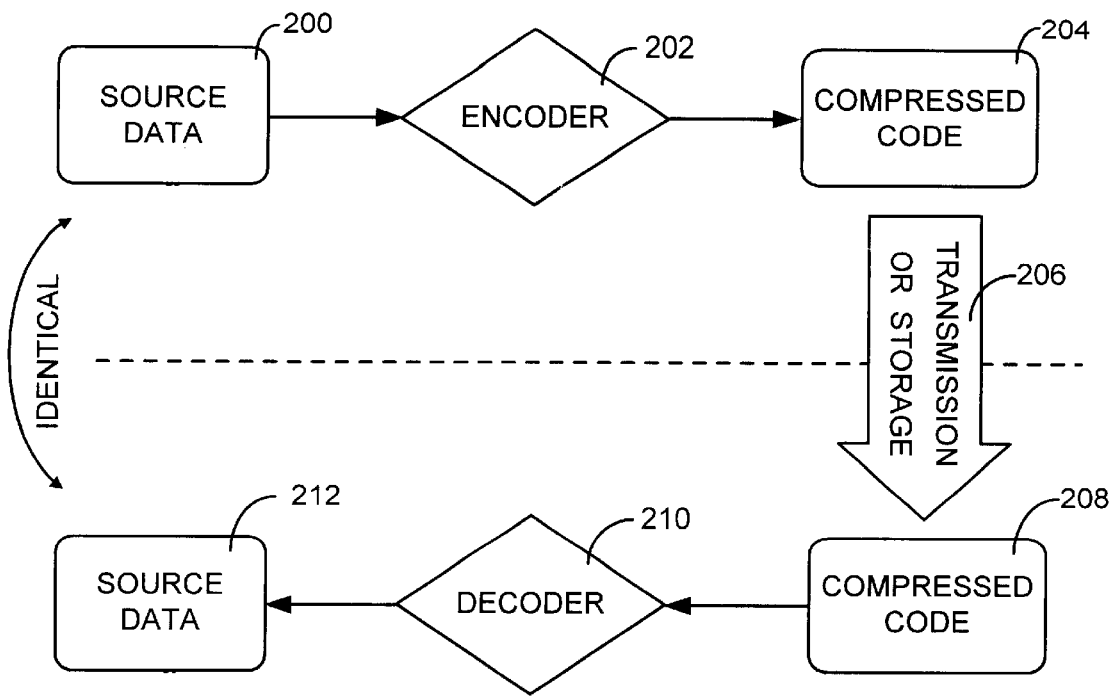
FIG. 2 is a block diagram depicting the general architecture of a lossless data compression system according to the present invention.

The general architecture of the lossless compression system embodying the present invention is outlined in the diagram of FIG. 2. Source data 200 is passed though an encoder 202 that compresses the data using a some coding scheme. The compressed data or code 204 contains all the information present in the source data 200, but is smaller (i.e., requires fewer bytes to describe, less memory or disk space to store, and less bandwidth or time to transmit). Once transmitted, or retrieved from memory or disk (as indicated by the arrow 206 in FIG. 2), the received compressed data 208 is decompressed via a decoder 210. Upon decompression the recovered source data 212 is identical to the source data—no loss of information has occurred, hence the compression is termed "lossless".

Figure 3:
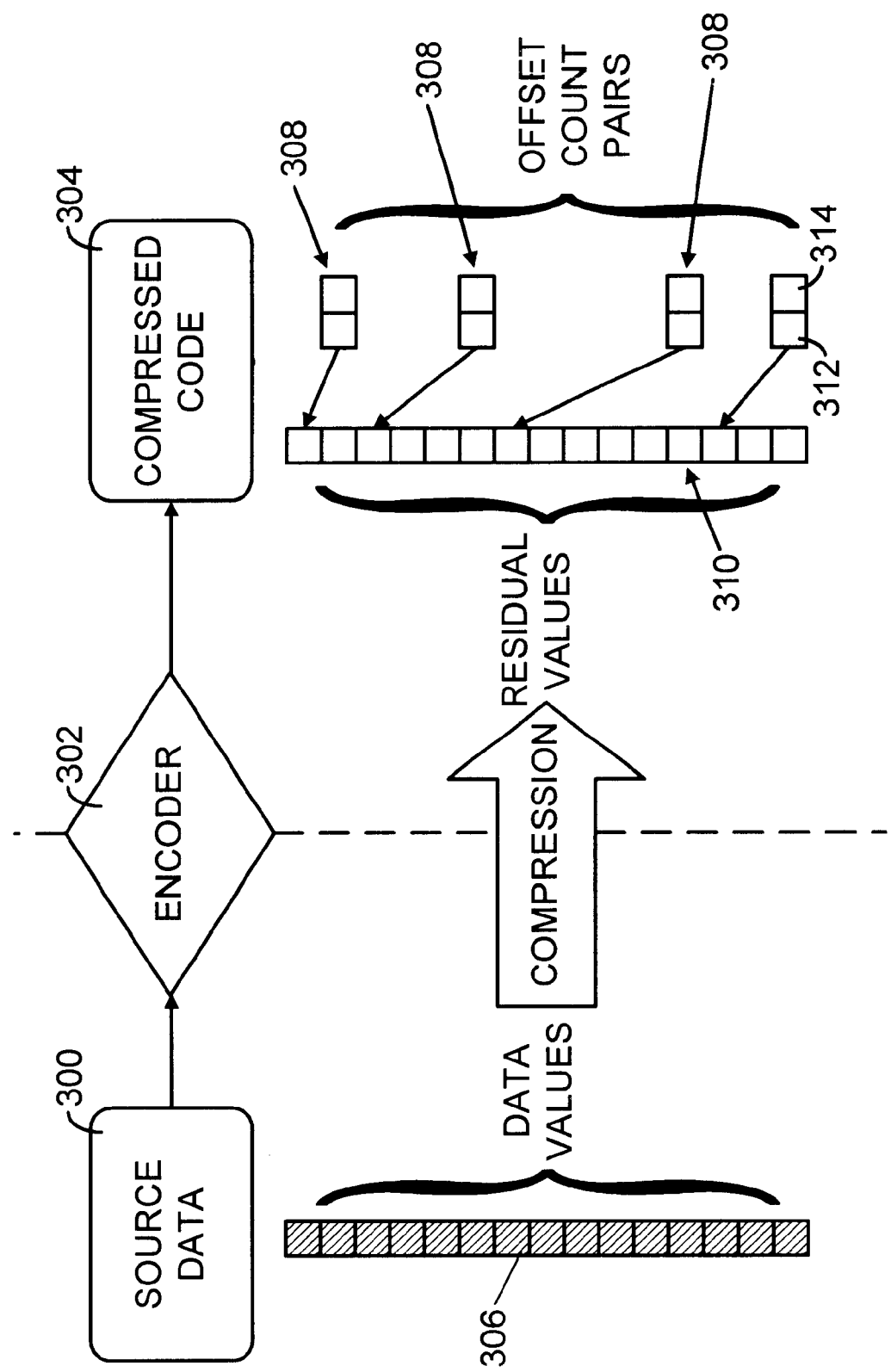
FIG. 3 is a diagram showing the basic architecture of the encoder portion of the data compression system of FIG. 2.

Referring to FIG. 3, the encoder 302 employs an encoding process that can be thought of as a transformation from source data 300 into compressed code 304. The source data 300 is typically composed of data values 306 stored on a computer with some accuracy (e.g. as bytes, integers, floats or doubles). The compressed code 304 consists of a plurality of offset-count pairs 308 each of which identifies the start and length of a block of earlier occurring source data 300, and a list of residual values 310 associated with an offset-count pair that reflects the differences between the identified block and the true values of the block of source data being encoded.

The offset-count pairs 308 identify the particular blocks of earlier occurring source data that best match the current block being encoded. The way in which this "best match" block is determined will be described shortly. Each offset-count pair 308 consists of two parts, an offset value 312 and a count value 314. The offset value 312 specifies how far back from the first data value in the block of source data being encoded that the beginning of the aforementioned earlier occurring "best match" block can be found. Thus, the offset value 312 designates a number corresponding to the number of data values constituting the offset. It should be noted that while the use of an offset value is preferred, other ways of pointing to a particular location in a string of source data values could also be employed if desired. It is not intended to limit the present invention to just the use of an offset value. The count value 314 is a number specifying how many data values are in the earlier occurring "best match" block beginning at the location identified by the offset value 312. The count value 314 also by its nature reflects the number of data values in the block of source data being encoded as there is a one to one correspondence in data value locations between the earlier occurring "best match" block and the block being encoded.

Figure 4:
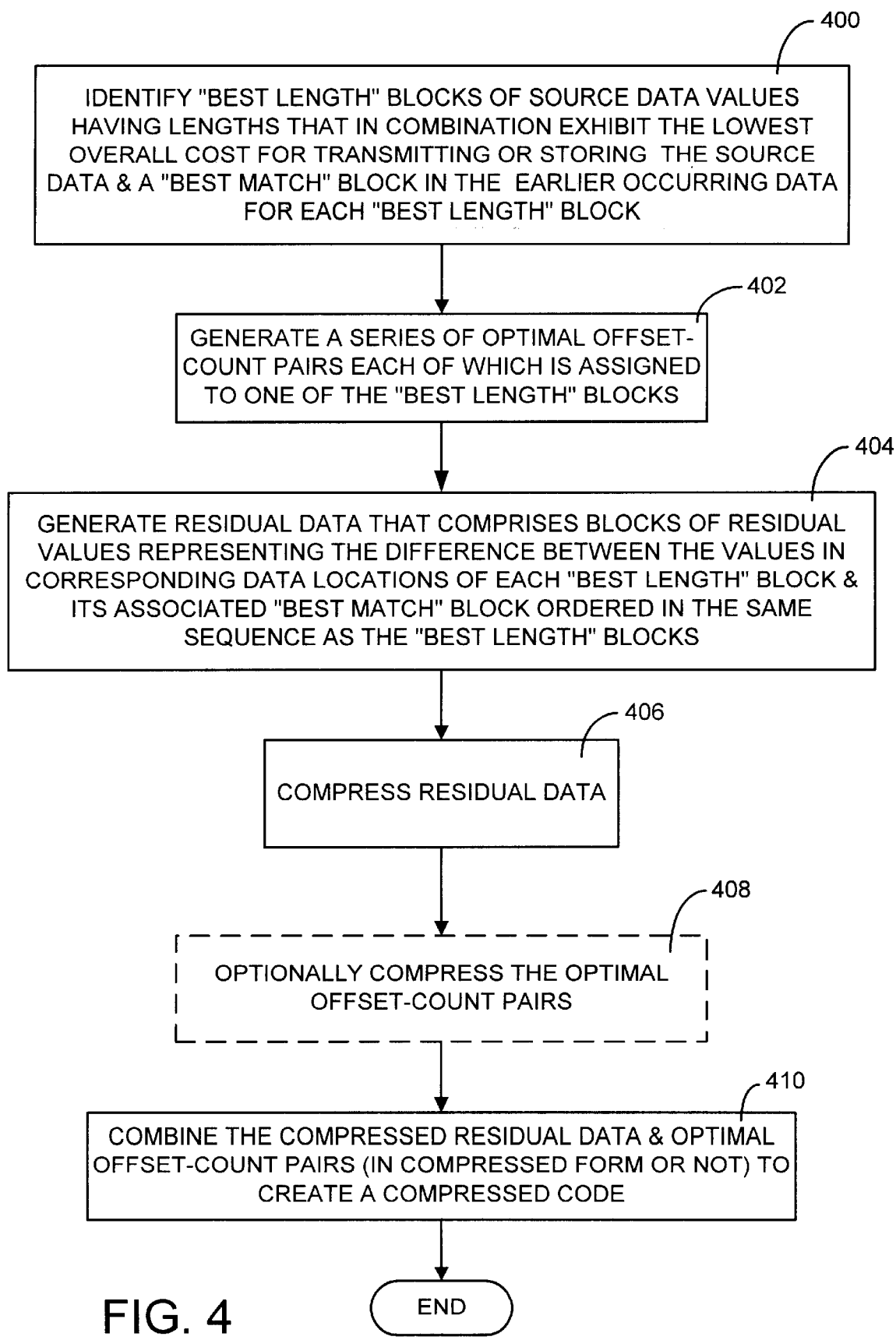
FIG. 4 is a flow diagram of an overall process for encoding data in accordance with the present invention.

FIG. 4 presents a high-level flow diagram of a computer program implementing the preferred encoder according to the present invention. In step 400, "best length" or optimal blocks of source data are identified. These "best length" blocks have lengths that in combination with each other exhibit approximately the lowest overall cost for transmitting or storing the source data. In general, the cost of transmitting or storing data is proportional to the amount of data that must ultimately be sent of stored. It will be explained later in this description how this cost is calculated. In addition, the initial step 400 of the encoding process includes identifying a "best match" block for each "best length" block. As will described in more detail later, the "best match" block is a block of earlier occurring source data that exhibits a minimal overall difference between it and the associated "best length" block. The next general step 402 in the encoding process involves generating a series of optimal offset-count pairs, each of which encodes the position and length of a "best length" block. In step 404, residual data is generated. This residual data includes blocks of residual values created by taking the difference between the values in corresponding data locations of each "best length" block and its associated "best match" block. The blocks of residual values are arranged within the residual data in the same order as the associated "best length" blocks are within the source data.

Figure 5A:
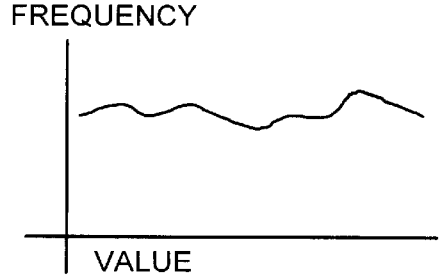
FIGS. 5A & 5B are graphs showing the theoretical distribution of data values in a high-entropy data source (FIG. 5A) and in a low-entropy data source (FIG. 5B).
Figure 5B:
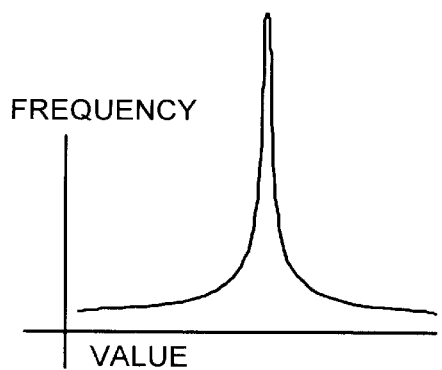

At first it may appear as though nothing has been gained by this transformation, in fact things look worse. Not only must as many residual values be transmitted as there were original data values, but now a series of offset-count pairs must be transmitted as well. However, the key to this process is that by applying the encoding transformation, the original series of high (zero-th order) entropy data values are converted into a series of much lower entropy residual values. This results because by choosing the block of previously occurring source data that best matches the block of data being encoded, the differences between them will be minimized. Therefore, the residual values are ensured of exhibiting a lower entropy. This conversion is illustrated in the diagrams of FIGS. 5A and 5B, where the graph of FIG. 5A plots the various original data values against their frequency in the source data and the graph of FIG. 5B plots the various residual values against their frequency in the computed residual data. As can be seen, the residual values tend to fall at or near a single value, which represents a minimum difference condition between the "best match" data block and the data block being encoded. By converting higher entropy source data to lower entropy residual values, entropy coding, including higher order techniques such as PPM, can effectively compress the computed residual data. Because of the process (as described below), the offset-count pairs associated with the residual data will by their nature also exhibit a reasonably low entropy. Accordingly, if desired the offset-count pairs could be compressed using the aforementioned techniques as well. Thus, as shown in FIG. 4, the preferred encoding process generally includes compressing the residual data (step 406), and optionally compressing the optimal offset-count pairs (step 408). The compressed residuals and the optimal offset-count pairs (whether compressed or not) are combined to form a compressed code for transmission or storage (step 410). This combining process preferably entails, prior to compressing either the residual data or the optimal offset-count pairs, assigning each offset-count pair to the data location of the residual data that corresponds to the data location associated with the first data value in the "best length" block to which the offset-count pair had been previously assigned. After compressing the residual data, and optimal offset-count pairs (if applicable), the two sets of data are simply transmitted or stored together to complete the combining process.

Generally, the quality of a match between a block of earlier occurring source data and the block of data being encoded is evaluated in view of the particular low entropy distribution that is desired. Thus, the goal is to identify blocks of earlier occurring source data that will generate residuals which fall within a desired, low entropy residual distribution. The earlier occurring block of a particular length is the best matching block of that length if its residuals best match the desired distribution of all candidate blocks.

This selection process will now be explained in detail by way of an example. For this example, a highly kurtotic double-sided exponential distribution is chosen, of the form:

$$P_{residual}(r = x) = \frac{e^{-\left|\frac{x}{\beta}\right|^\alpha}}{\int_{-\infty}^{\infty} e^{-\left|\frac{z}{\beta}\right|^\alpha} dz} \quad (1)$$

This distribution gives a high probability ($P_{residual}$) to values centered around zero and quickly falls off for values away from zero. It should be noted that the foregoing distribution was chosen as an example only. Other distribution functions could be employed, as desired, as long as the ultimate result is to minimize the entropy of the difference between compared blocks of data and facilitate finding the "best match" block of earlier occurring source data for each block of source data being considered for encoding.

Figure 6A:
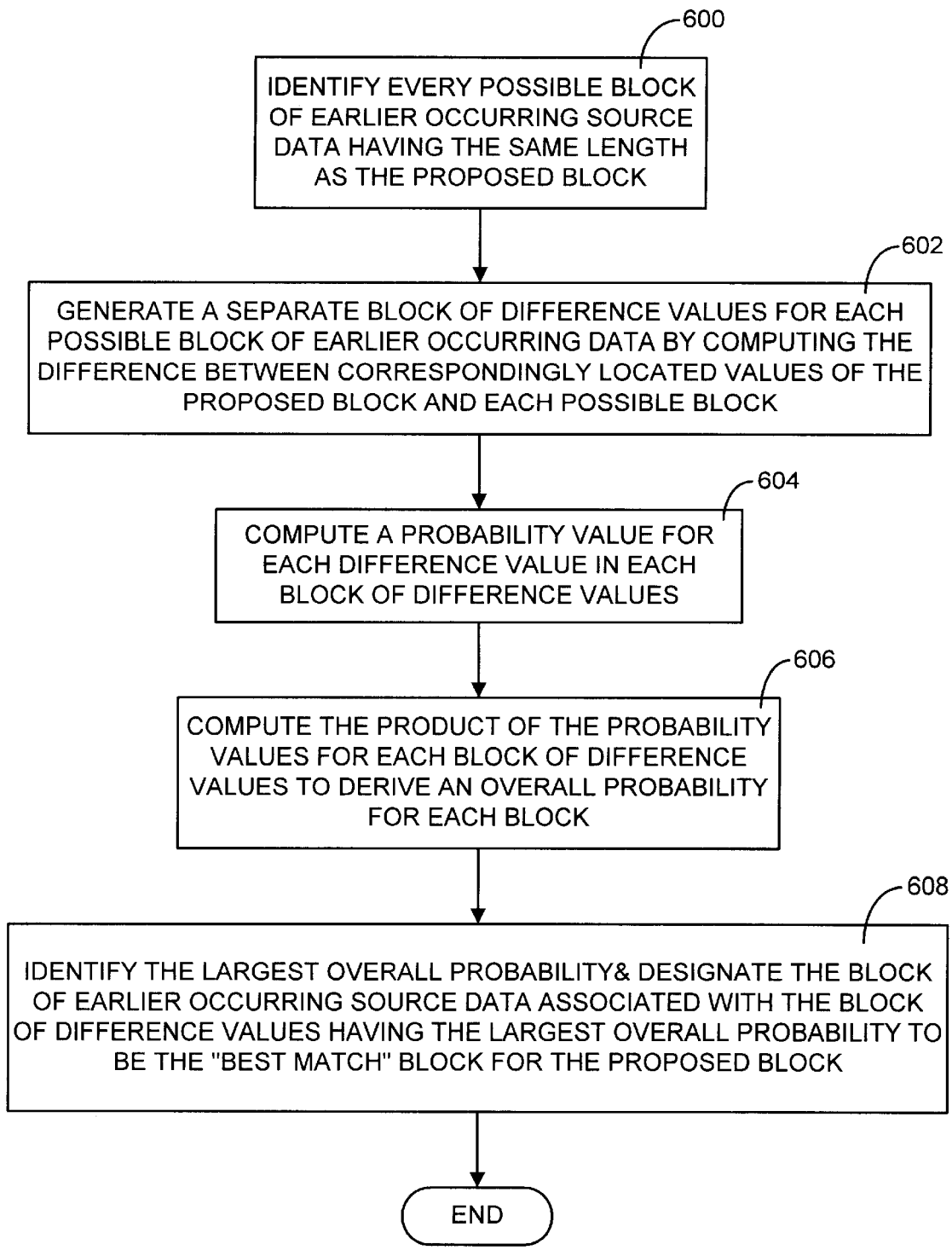
FIG. 6A is a flow diagram of a first preferred process for accomplishing the "best match" block module of the overall process of FIG. 4.

The "best match" data block is defined for the purposes of one preferred embodiment of the present invention as the closest earlier occurring block of source data values having the same length as the data being encoded and having residuals which best match the chosen distribution model. While it is not necessary to select the closest block, should there be more than one exhibiting the same "highest" overall probability, it is preferred in order to potentially lower the cost associated with transmitting or storing the offset-count pair used to identify the location of the "best match" block. As shown in FIG. 6A, the "best match" block is found by first identifying every possible block of earlier occurring source data that has the same length as the block of source data under consideration (step 600). Next, in step 602, a block of difference values is generated by calculating the difference between each data value of the block of source data under consideration and the data values from the corresponding data locations of a candidate block of earlier occurring source data. This process is repeated for each candidate block. At this point, in step 604, each of the difference values associated with each candidate block is plugged into a distribution equation, such as Equation 1, to generate probability values representing the probability that each difference value lies in the chosen distribution. In step 606, the individual probability values associated with each candidate block of earlier occurring source data are multiplied together to form an overall probability value that is indicative of how closely a candidate block of earlier occurring source data matches the block of data under consideration. Finally, in step 608, the candidate block of earlier occurring source data associated with the largest of the computed overall probabilities is designated as the "best match" block for the block of source data under consideration.

Figure 6B:
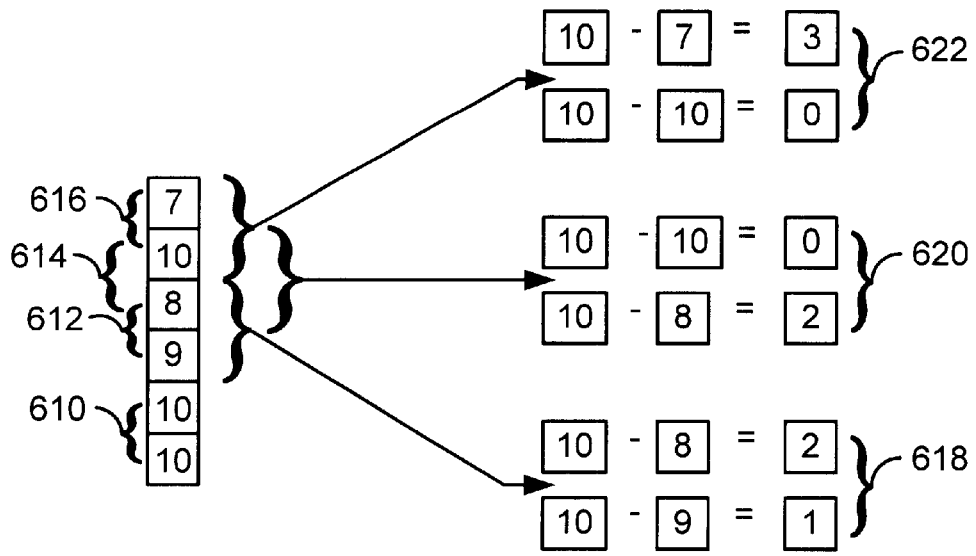
FIG. 6B is a diagram illustrating the step in FIG. 6A of generating a separate block of difference value for each possible block of earlier occurring data by computing the difference between correspondingly located values of a proposed block and each possible block of earlier occurring data.

The foregoing process is illustrated in simplistic terms in FIG. 6B where the block 610 under consideration for encoding has a count of 2 (i.e., is two data values in length) and is preceded by four earlier occurring source data values. As is shown, there are three possible two-value long candidate blocks 612, 614, 616 that can be compared to the block 600 being encoded. The right hand side of FIG. 6B shows the data values of each candidate block 612, 614, 616 being subtracted from the block 610 to produce three candidate residual blocks 618, 620, 622. As described above but not shown, the residual values of each of the candidate residual blocks would next be plugged into a distribution equation to produce probability values which would then be multiplied together to form the overall probability value. The candidate block having the highest overall probability value would be selected as the "best match" block.

According to the foregoing process of finding the "best match" block of earlier occurring source data for a particular block of data being considered for encoding, every possible candidate block of earlier occurring data is analyzed. While this has the advantage of ensuring the most accurate selection of a "best match" block, it can be processor intensive. For example, if the block under consideration for encoding is near the middle or end of a large amount of source data, the number of possible earlier occurring data blocks could be quite large. Thus, checking every one of them can expend considerable amounts of processing time. This may or may not be an issue in the application to which the present invention is being employed. However, if reducing the processing time required for encoding the data is desired, a possible solution could be to define what is deemed to be the closest, best matching block of earlier occurring source data differently than discussed above. Essentially, a threshold could be established wherein the first block of earlier occurring source data that exhibits an overall probability exceeding the threshold would be selected as the "best match" block. Therefore, instead of identifying every possible block of earlier occurring data for comparison to the block under consideration for encoding, the process would be modified such that the closest block is compared, followed by the next closest block, and so on until one of the blocks exhibits a probability exceeding the threshold. Of course, this alternate method may not result in finding a "best match" block with the absolute minimum possible difference between it and the block of data under consideration for encoding. And therefore, the difference between the blocks may not exhibit the lowest possible entropy. Theoretically, this would limit the degree of compression that would be possible. However, if the threshold is chosen carefully, any lowering of the degree of compression may not be significant, or if significant, may be acceptable in the context of the particular application for which the present invention is adopted. Accordingly, this alternative method may be advantageous, even if not as accurate, because it can provide an acceptable compression ratio, while reducing the processing time required to encode the source data.

Figure 6C:
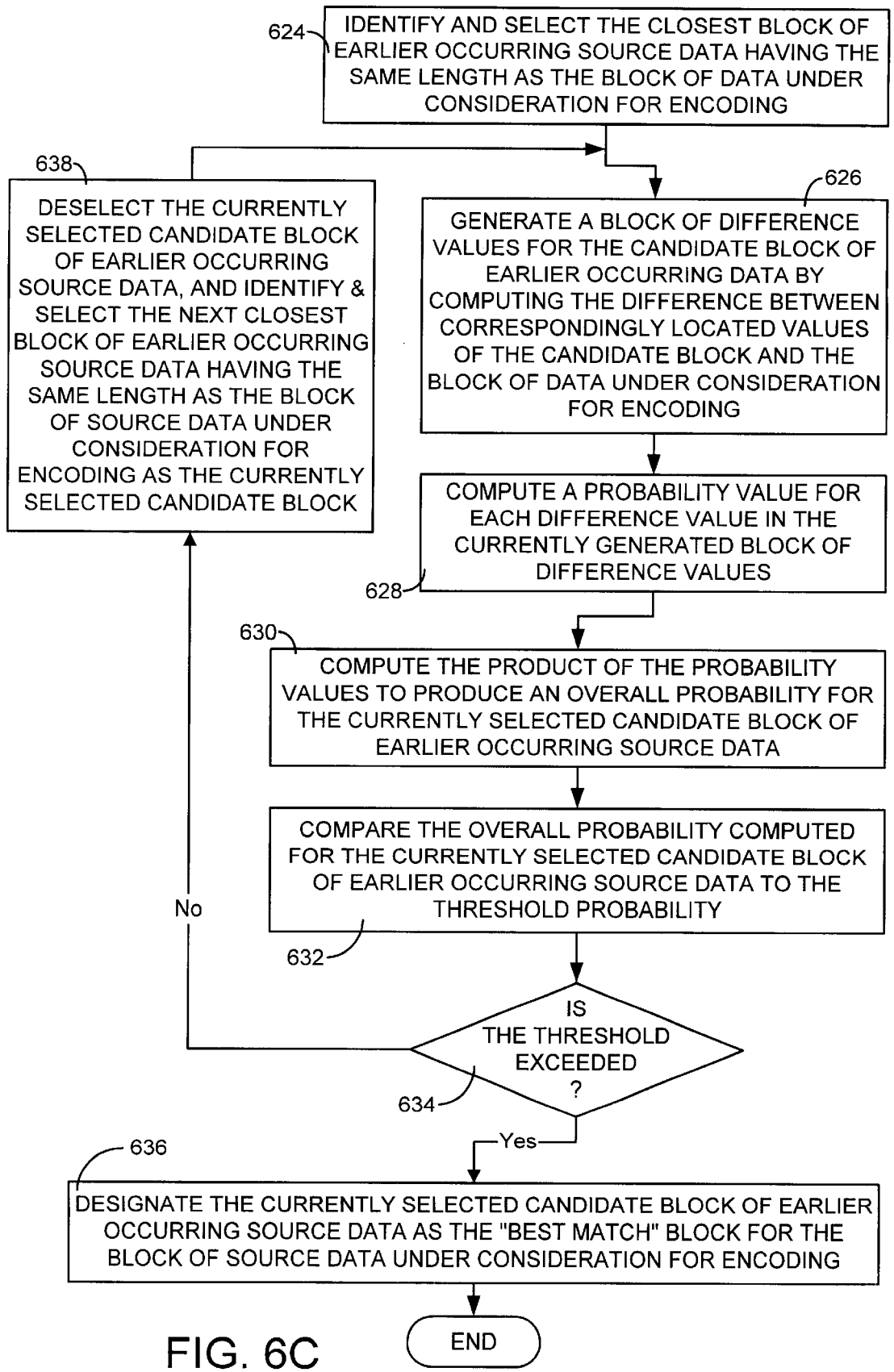
FIG. 6C is a flow diagram of a second preferred process for accomplishing the "best match" block module of the overall process of FIG. 4.

A preferred process for implementing the alternative method of choosing a "best match" block of earlier occurring source data is presented in FIG. 6C. In step 624, the closest block of earlier occurring source data having the same length as the block under consideration for encoding is identified and selected. Next, in step 626, a block of difference values is generated by computing the difference between each value of the currently selected candidate block of earlier occurring source data (which is the closest block in this first case) and the correspondingly located values of the block of source data under consideration for encoding. A probability value is computed for each difference value in step 628. Then, in step 630, the overall probability for the currently selected candidate block of earlier occurring source data is computed by multiplying the individual probability values of the difference block together. This overall probability is compared to a threshold value in step 632. If it is determined in step 634 that the threshold value is exceeded by the computed overall probability, then the currently selected candidate block of earlier occurring source data is designated as the "best match" block for the block of source data under consideration (step 636). However, if the threshold is not exceeded, then the currently selected candidate block is deselected, and the next closest block of earlier occurring source data is identified and selected (step 638). Steps 626 through 636 or 638 are then repeated until a "best match" block is found.

In the foregoing description of the process for determining the "best match" block, the question of how large the block of source data to be encoded should be was not addressed. However, to determine the overall best matching block of earlier occurring source data, not only must the question of which earlier block to use be decided, but also how large a block. If the block is longer, then fewer offset-count pairs are ultimately needed to explain the data; however, using a longer block, may result in a residual distribution which is less kurtotic (or in the general case, diverges more from the target distribution). Thus, the task involves determining the optimal balance between block length and the residual distribution.

The preferred solution to finding the optimal balance is perhaps counterintuitive. The idea is to compress the data backwards—that is, to compress the data in an order which is reverse of the order in which it eventually will be transmitted and decoded. Note that this order is not inherently linked to the "natural" order of the data—for example, the left to right order of characters in a book, or the samples of sound in the order that they were recorded. The transmission and decoding of the data can occur in any order known to both the transmitter and receiver. In practice however, such rearrangements are rarely done. For the purposes of this description it will be assumed that the decoding order is the same as the "natural" order of the data.

With the foregoing balance in mind, the preferred encoding process begins by coding from the last data value. In general, this is accomplished (as is the subsequent encoding of the rest of the data values) by answering the question: "suppose all the data up to a particular data value has already been received and decoded; how then can the data values best be predicted from this point forward?" For the data value occupying the last data position in the source data the answer is fairly straightforward.

Figure 7:
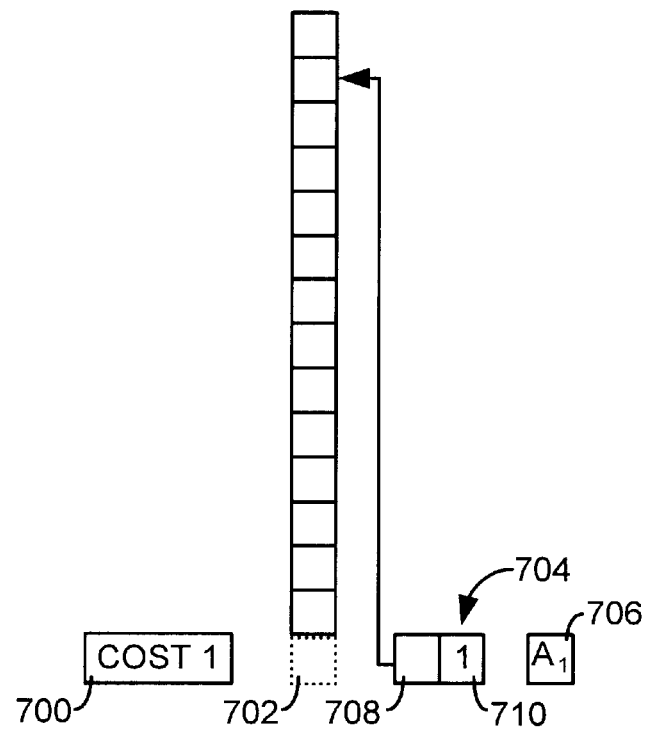
FIG. 7 is a diagram illustrating the process of determining the cost of encoding the last data value of the source data.

Referring to FIG. 7, the process of determining the cost of encoding just the last data value (i.e. a block constituting one value) is illustrated. Thus, the task reduces to one of finding the next closest earlier single data value that will produce the "best match" (i.e., the highest probability $P_{residual}$), via the process described previously. Once the "best match" block has been identified, the next step in the encoding process is to calculate the cost associated with transmitting the data. The cost 700 (labeled "Cost 1" in FIG. 7) of transmitting the last data value 702 is the sum of the cost of the required offset-counter pair 704 and the cost of the residual 706 ($A_1$) representing the difference between the two data values, i.e., $$Cost1 = \log_2(MaxOffset) + \log_2(MaxCount) + \log_2\left(\frac{1}{P_{residual}(r = A1)}\right) = \log_2\left(\frac{MaxOffset \times MaxCount}{P_{residual}(r = A1)}\right) \quad (2)$$

The "A1" value is the residual representing the difference between the single (last) data value being encoded and a one value block of earlier occurring source data. The "MaxOffset" value represents the number of bits required to specify the maximum possible number of data values back from the first value of a block being decoded that the first value of the best matching block can be found. For example, if the offset can vary between 1 and 1024 data values, then 10 bits (i.e., $1024=2^{10}$) would be the maximum number of bits needed to represent any possible offset (i.e. the MaxOffset). Similarly, the "MaxCount" value represents the number of bits needed to specify the maximum possible number of data values in a best matching block (as well as the block being encoded). Thus, MaxCount refers to the maximum block size permitted. While theoretically any block length is permissible, limiting the number of values that a block can have will reduce processing time. In addition, since the larger MaxCount gets, the higher the encoding costs (in accordance with Equation (1)), limiting the number of values in a block can also increase compression efficiency.

Note that in FIG. 7, and subsequent similarly formatted figures, the left hand box 708 of the offset-count pair represents the offset number. In all the figures this offset box is left blank and instead an arrow is used to point to a location in the earlier occurring source data. This illustration of the offset is meant to be symbolic so as to imply the offset refers to any earlier location in the source data, not to a particular one. The right hand box 710 of the offset-count pair contains the count or size of the earlier occurring block of source data beginning at the location identified by the offset. In the depicted case this number is "1".

Figure 8:
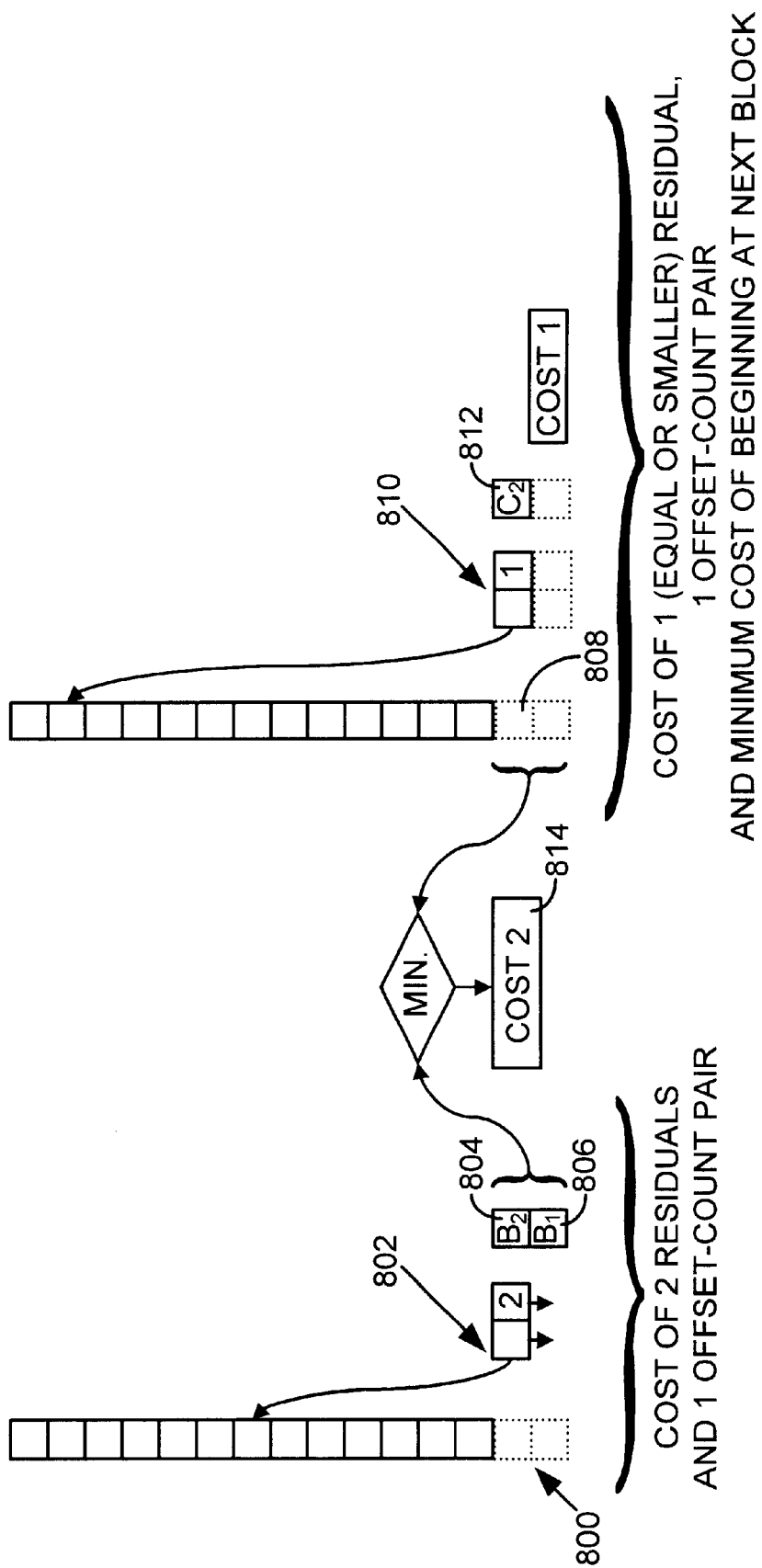
FIG. 8 is a diagram illustrating the process of determining the minimum cost of encoding and the "best length" block for the last two data values of the source data.

For the second data value the computation makes the comparison as illustrated in FIG. 8. The two last data values can be encoded in one of two ways. As shown on the left hand side of FIG. 8, a single block 800 could be used for both data values (i.e., the count=2), requiring one offset-count pair 802 and two residuals 804, 806 ($B_1$, $B_2$). The residuals 804, 806 are derived by performing the previously-described "best match" process to determine the closest two-value long block of earlier occurring source data that represents the minimum deviation from the two-value long block 800 being encoded and then recording the difference between the corresponding values in the two blocks. The offset-count pair associated with this alternative is simply the offset to the beginning of the aforementioned "best match" block and a count of "2" designating that the "best match" block found at the offset location is two data values long. The first alternative is compared to the second by calculating a cost associated with coding the data in this way. In other words the cost of the offset-count pair and the two residuals. This cost can be calculated by the following formula:

$$Cost2 = \log_2(MaxOffset) + \log_2(MaxCount) + \log_2\left(\frac{1}{P_{residual}(r = B1)}\right) + \log_2\left(\frac{1}{P_{residual}(r = B2)}\right) \quad (3)$$

where the "MaxOffset" and "MaxCount" terms are as defined previously in connection with Equation (2), and Bx represents the residuals.

Alternatively, as shown on the right hand side of FIG. 8, a shorter block 808 could be used (i.e., the count=1), requiring one offset-count pair 810 plus one residual 812 ($C_2$). The offset-count pair 810, residual 812 and the associated cost are derived similar to the method described in conjunction with deriving the like terms for the last data value. It is noted that in this second alternative the residual must be equal or smaller than the corresponding residual in the first alternative (i.e., in FIG. 8, $C_2 < B_2$), and will therefore require the same or fewer bits to encode. However, to make the comparison between the two options meaningful, in the second alternative, the minimum cost of coding the rest of the data values (which in this case is just the last data value) with a block beginning at the last data value must also be added as part of the overall cost of the second alternative. The minimum cost of coding the rest of the data values has already been calculated as the above-described Cost 1. This relationship will be explained in greater detail later in this description in connection with a discussion of the general case of computing the cost associated with any sized block.

Once the total costs associated with the two alternative coding possibilities has been calculated, they are compared and the smaller of the two is designated as the winner. This has two effects. First, the offset-count pair that is associated with the winning alternative is assigned to the second to the last data value location. In addition, the cost 814 associated with the winning alternative is designated as "Cost 2".

It should be noted that this "Cost 2" represents the minimum cost for coding the last two data values in that it is either the cost of coding both values together or is the cost of coding the second to the last value plus the cost of coding the last value with its own block. Thus, it can be said that in general the optimal length of a block (i.e., the one having the lowest cost) can be established by comparing the cost of a longer block to the cost of ending the block earlier combined with the minimum cost of coding beginning with a new block from that point down in the data, regardless of the number of data values in the block. This reveals one of the key advantages of coding the source data from the last data value forward. The aforementioned minimum cost of coding beginning with a new block at a particular location down from the block being encoded has already been calculated in each case.

Figure 9:
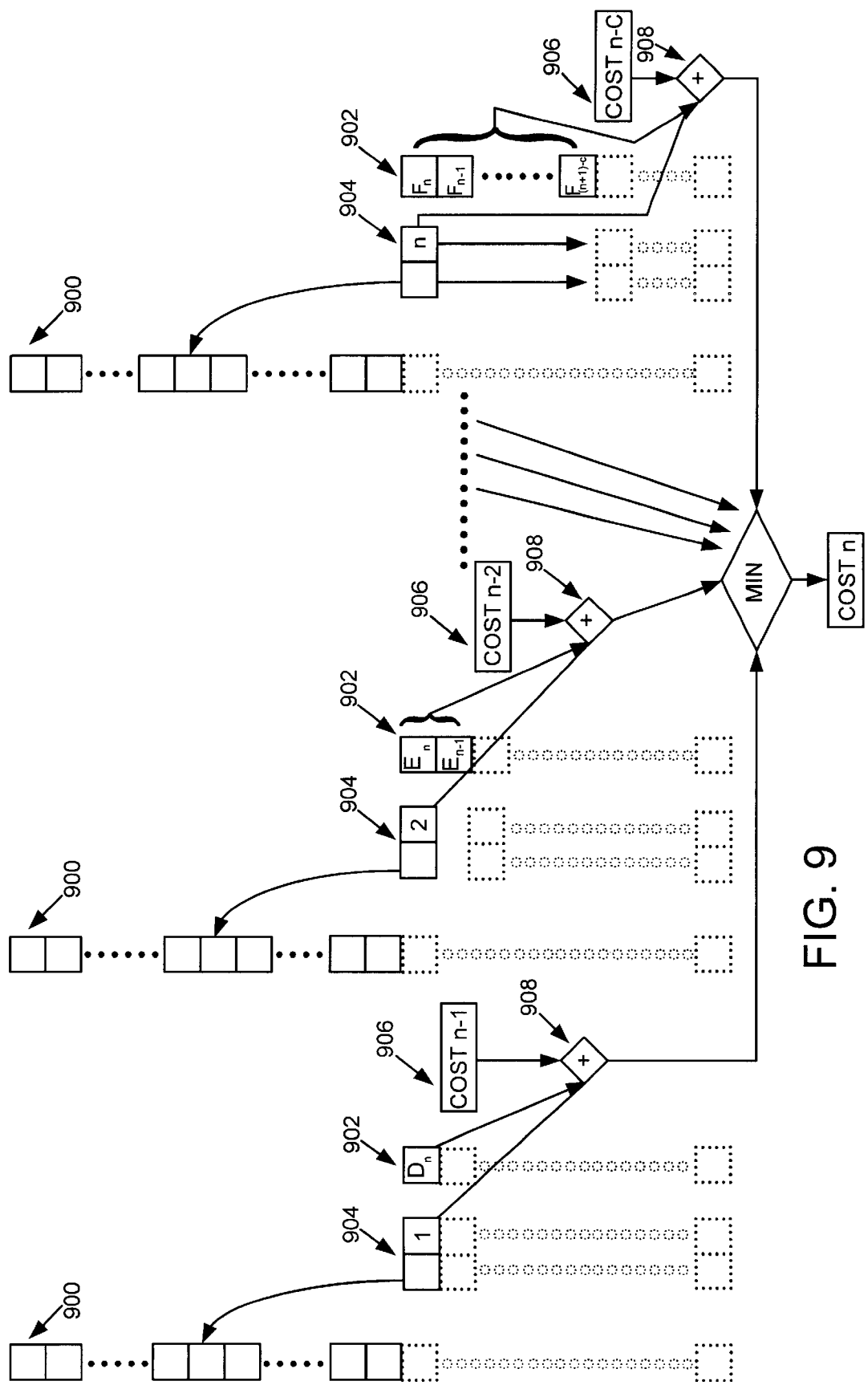
FIG. 9 is a diagram illustrating the process of determining the minimum cost of encoding and the "best length" block beginning at any location in the source data.

In the general case, for determining the "best length" block for beginning at any location "n" in the source data 900, a comparison of all possible block lengths is performed, as illustrated in FIG. 9. For purposes of the following description, the location numbers "n" begin at the last value and increase for each earlier occurring data value. Thus, the last data value is assigned location number 1.

The total number of possible block lengths will vary depending on the position of location n in the source data and the prescribed MaxCount. For example, if the source data is large and location n is in the middle, then the number of possible block sizes could be as many as there are data values between location n and the last data value. However, if the MaxCount is a smaller number than the number of data values between location n and the last data value, then the number of possible blocks would be limited to the MaxCount number. Whether or not location n is near the beginning or end of the source data is also an important factor in determining the number of possible blocks that have to be considered in the "best length" analysis. For example, if location n is near the end of the source data such that the number of data values between location n and the last data value is smaller than MaxCount, then the number of possible blocks is limited to the number of data values between location n and the last data value. The number of possible blocks that must be considered in the "best length" analysis is also limited when location n is near the beginning of the source data, although for a different reason. In this latter case, it should be remembered that the size of a block of data being encoded is limited to the size of the source data preceding it. Thus, since the size of the possible blocks is limited, so is the number of possible blocks that have to be considered in the "best length" analysis. For example, if location n represents the third data value in the source data, then only two earlier occurring data values exist upon which the necessary residuals can be formed to encode the data. Consequently, the maximum block size that can be used to encode data starting at the third data value is two. If the maximum block size is to, there are only two possible block lengths that need be analyzed, namely a one-&value block and a two-value block. Thus, in general the number of possible block lengths that must be considered in the "best length" analysis is the smallest of (i) the MaxCount, (ii) the number of data values from location n and the last data value, or (iii) the number of data values preceding location n.

For each proposed block length that must be considered in the "best length" analysis, the cost of transmitting or storing the residuals 902 must be included in the total cost associated with a proposed block. The residuals 902 are derived by performing the previously-described "best match" process to identify the best matching block of the same length in the earlier occurring source data and then recording the difference between the corresponding values in the proposed block and the "best match" block. An offset-count pair 904 identifying the offset to the beginning of the "best match" and its count (i.e., length) is established and associated with the proposed block. Then the cost of coding the data using the proposed block length is calculated. In each case, the total cost 906 is the cost of sending one offset-count pair, plus the cost of the residuals (the number of residuals is indicated by the count), plus the minimum cost of coding the remaining data values. This summing process is represented by the diamond-shaped symbols with the plus sign 908 in FIG. 9. As in the case of the previously-described case where n=2, the cost of residuals for shorter blocks must be equal to or smaller than the cost of the corresponding residuals using longer blocks. However, the cost of coding the remaining data values beginning at the end of the block will be greater for shorter blocks than for longer ones, as more data values will remain to be coded. Additionally, as in the case of n=2, for each block length, the minimum cost of coding beginning at the next data value is known as it was already computed and stored as Cost n−1. . . Cost n-C. In general, this total cost 806 can be calculated by the following formula:

$$Cost = \log_2(MaxOffset) + \log_2(MaxCount) + \log_2\left(\frac{1}{P_{residual}(r = Rn)}\right) + \quad (4)$$
$$\cdots + \log_2\left(\frac{1}{P_{residual}(r = R(n+1) - c)}\right) + Cost n - c$$

where the "MaxOffset" and "MaxCount" terms are as defined previously in connection with Equation (2), R represents a residual (which are designated as Dx, Ex, and Fx in FIG. 9), and C represents one of (i) the MaxCount, (ii) the number of data values from location n and the last data value, or (iii) the number of data values preceding location n—whichever is smallest.

The minimum cost of coding the rest of the data values from location n down is established by choosing the smallest cost generated by the above-described analysis of all the possible block lengths. This minimum cost is designated and stored as Cost n. In addition, the offset-count pair that is associated with the winning block length is assigned to location n.

Progressing in the foregoing way, the optimal block can be determined for initiating coding at each data value in the source data. However, when the process reaches the first data value, there is no preceding data that can be used to generate the residual required in the present encoding process. This problem is solved by using a predetermined constant as a substitute for an earlier occurring data value and proceeding as described previously. Preferably, this constant represents the expected mean of the data values. For example, when dealing with image data, the constant could be 128 representing a mean pixel value. In the case that the source data constitutes sound data, the constant could be zero. How the predetermined constant is used will be discussed later in this description. However, it should be noted here that there is no need to calculate costs or generate an offset-count pair with respect to the first data location.

Figure 10A:
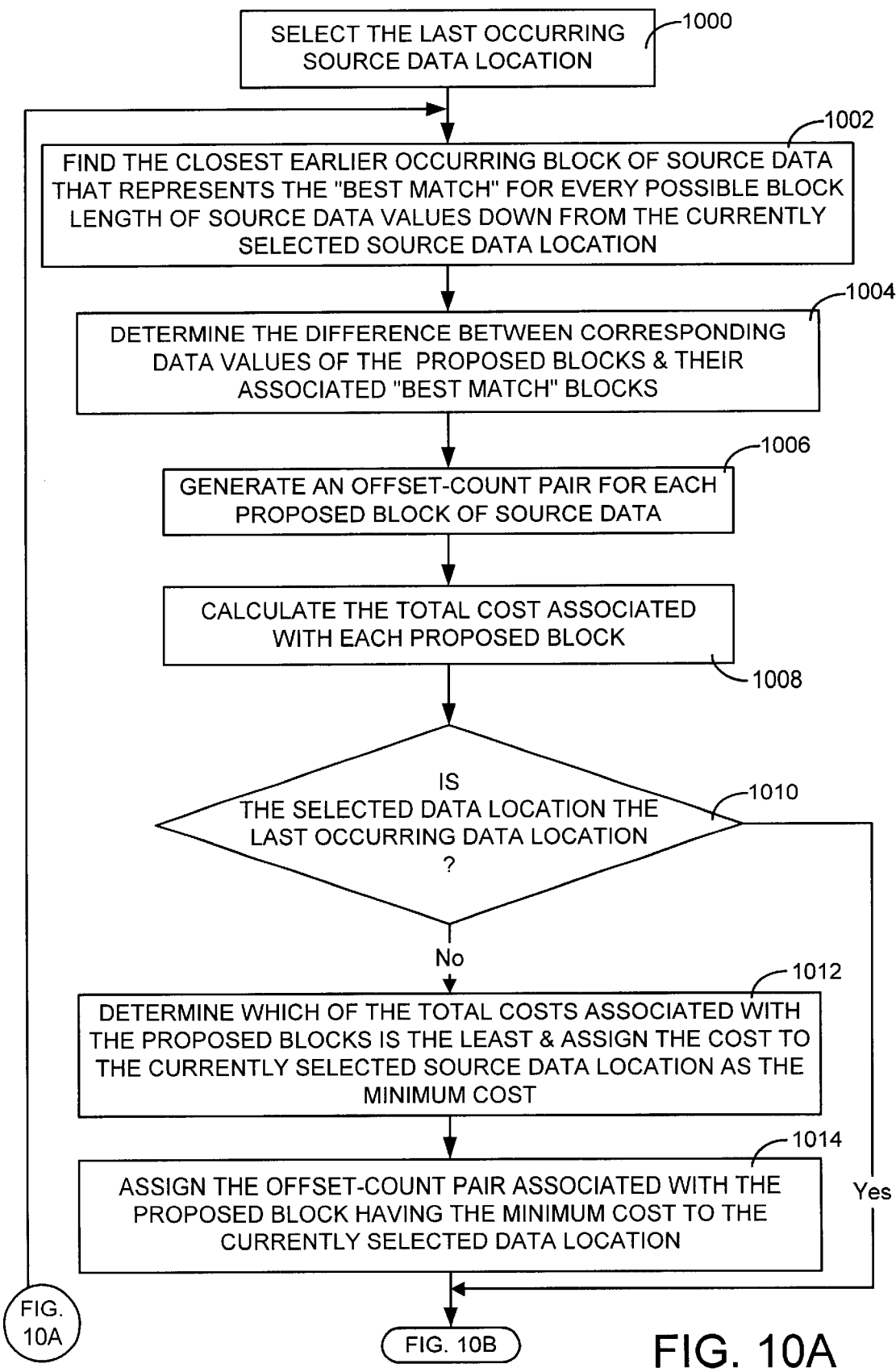
FIGS. 10A through 10D are flow diagrams showing a combined process for accomplishing the modules of the overall process of FIG. 4 directed at identifying the "best length" and "best match" block, as well generating a series of optimal offset-count pairs and residual data.
Figure 10B:
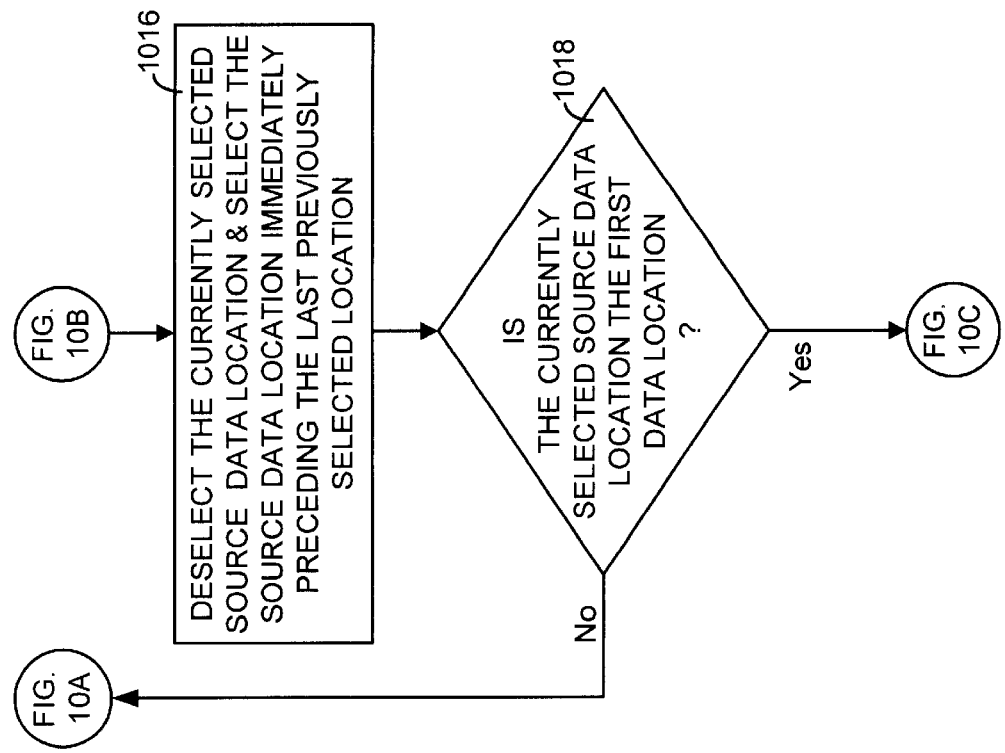

FIGS. 10A and 10B present a flow diagram of a computer program for implementing the foregoing portion of the encoding process to identify the "best length" block and associated "best match" block for each data location. This flow diagram essentially implements high-level step 400 of FIG. 4. In step 1000, the last occurring data location of the source data is selected. The last data location will remain selected until a cost and an offset-count pair have been generated for that location. Thereafter, it will be deselected and the immediately preceding location is selected (step 1016). Similar steps are taken for each successively selected data location. Namely, in step 1002, the closest earlier occurring block of source data constituting the "best match" is found for every block length that can possibly be formed starting at the selected location and moving back toward the last source data location (hereinafter referred to as proposed blocks). It is noted that in the case of the last data location where there is only one possible block length (i.e., a single-value block), that block represents the sole proposed block. Next, in step 1004, a difference is computed between each data value in each proposed block and the data values in the corresponding locations in the "best match" block associated with the particular proposed block being processed. In addition, in step 1006, an offset-count pair is generated for each proposed block. The total cost associated with each block is then calculated in step 1008. As explained previously, this total cost is the sum of the cost to transmit or store (i) the offset-count pair, (ii) the residuals (i.e., the differences computed in step 1004), and (iii) the minimum cost to code all the source data following the end of the proposed block. In the case of the last data value, there is no cost to code the remaining data, and so this part of the total cost is ignored. If it is determined in step 1010 that the selected data location is not the last data location, then the next two steps 1012, 1014 are performed. If the selected location is the last location, then these steps are skipped. In step 1012, it is determined which of the total costs calculated for the proposed blocks associated with a data location is the least. This minimum cost is assigned to the currently selected data location. In addition, the offset-count pair associated with the proposed block having the minimum cost is assigned to the currently selected data location (step 1014). In step 1016, the currently selected data location is deselected and the immediately preceding location is selected. If it is determined in step 1018 that the newly selected location is the first data location in the source data, then the program proceeds on to the designation of the optimal offset-count pairs as will be described below. If, however, the newly selected location is not the first data location of the source data, then the foregoing steps 1002 through 1018 are repeated. In this way, an offset-count pair is eventually assigned to each data location with the exception of the first.

At this point in the process, the data values can be encoded (i.e., transformed into offset-count pairs and residual values) by "chaining through" the offset-count pairs. Referring to the far left hand side of FIG. 11, this part of the process involves starting with the offset-count pair 1100. This first offset-count pair 1100 is associated with the second occurring data value. There is no offset-count pair associated with the first occurring data value. The chaining process proceeds by following the counts of each offset-count pair to identify all the optimal pairs. In other words, the offset-count pair 1100 becomes one of the optimal pairs by default. Thereafter, subsequent optimal pairs are identified as the offset-count pair associated with the data value following the number of locations identified by the count of the preceding optimal pair (which represents the size of the optimal block of data encoded starting at the previous location). In the case of the first optimal offset-count pair, which must have a count of 1, the process automatically points to the offset-count pair 1102 associated with the third data value location. Continuing on with the example illustrated in FIG. 11, the second-identified optimal offset-count pair 1102 has a count of two. Thus, the third optimal pair 1104 would be the one associated with the fifth data value position. Similarly, since the count of the third pair 1104 is four, the fourth optimal offset-count pair 1106 is associated with the ninth data value position. And finally, the fifth optimal pair 1108 would be associated with the sixteenth data value location since the count in the fourth pair 1106 was seven. This chaining process would continue until all the optimal offset-count pairs have been identified.

Figure 10D:
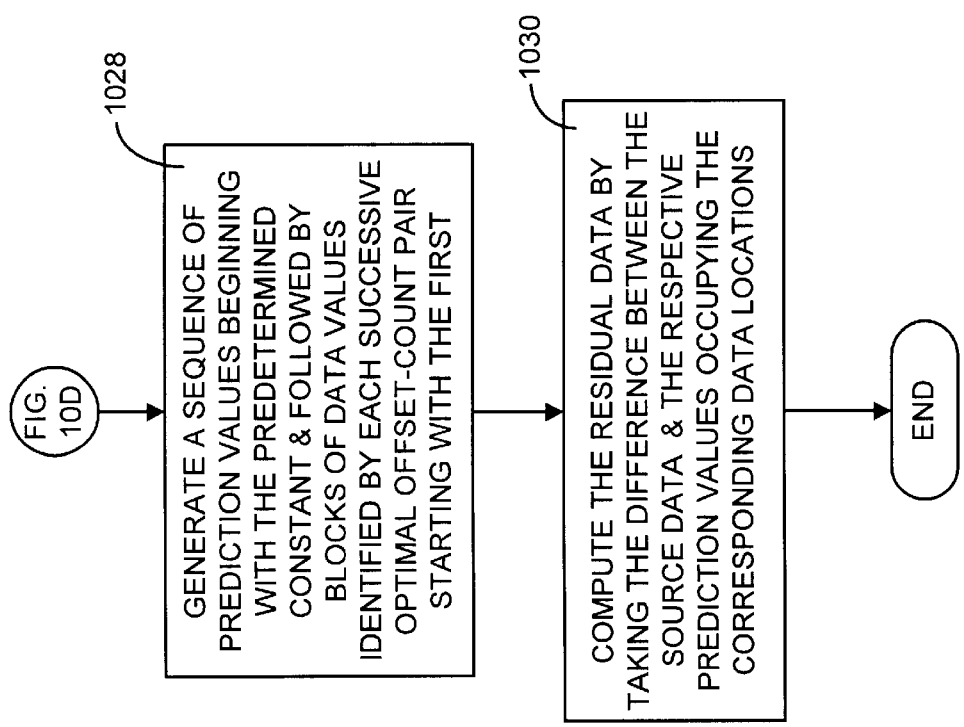
Figure 10C:
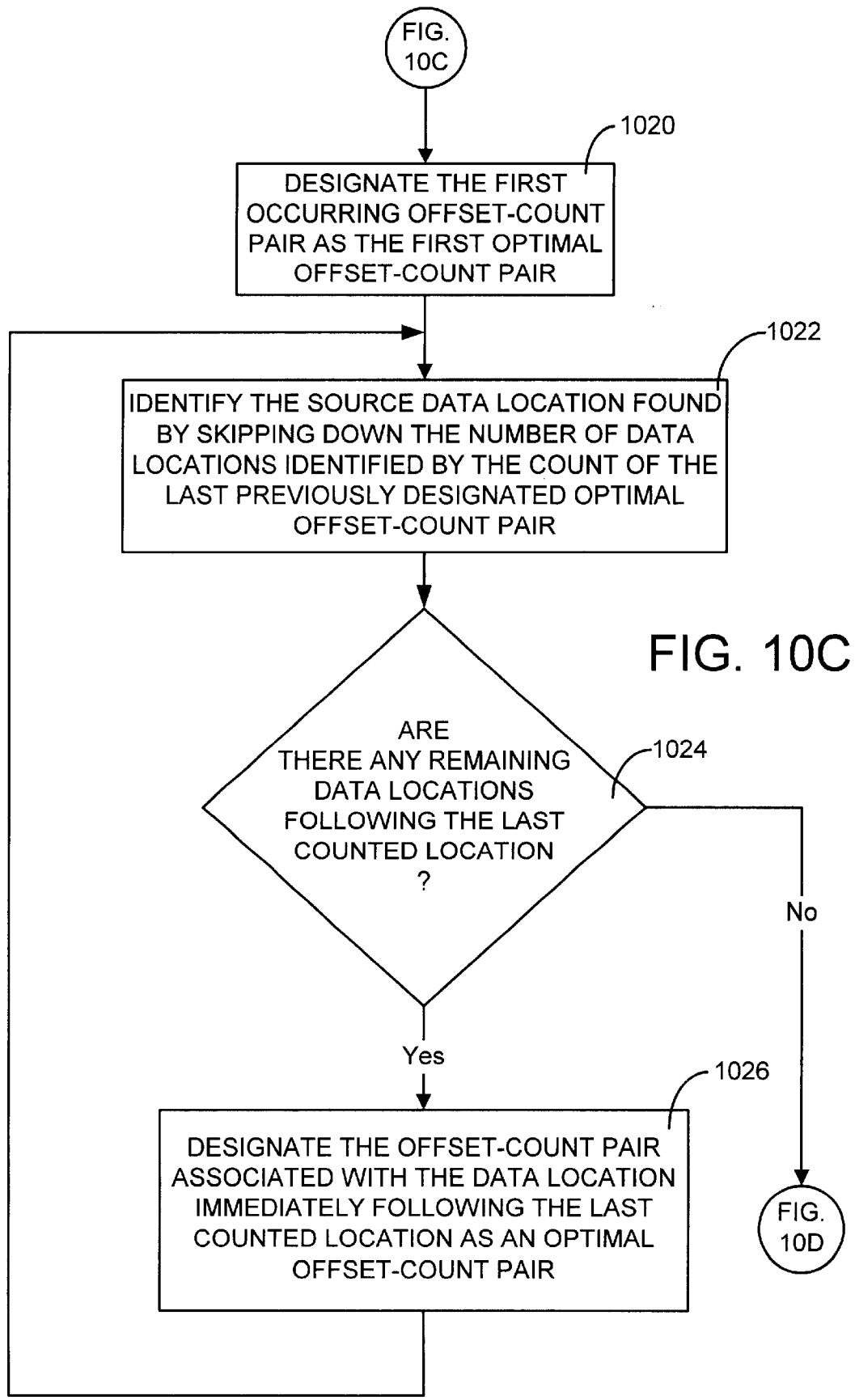

FIG. 10C continues the flow diagram of the aforementioned computer program, and specifically presents the portion for implementing the identification of the optimal offset-count pairs as described in the preceding paragraph and corresponding to the high-level step 402 of FIG. 4. In step 1020, the first occurring offset-count pair, which is associated with the second data location, is designated as the first optimal offset-count pair. Then, in step 1022, a data location is identified by skipping down through the source data by the number of data locations indicated in the count of the last previously designated optimal offset-count pair (which is the first offset-count pair in this case). In the skipping down process, the data location associated with the previously designated offset-count pair is included in the counting. In accordance with step 1024, if there are any remaining data locations following the last counted location, then the offset-count pair associated with that next location is designated as an optimal offset-count pair in step 1026, and steps 1020 through 1024 are repeated to identify all the remaining optimal offset-count pairs. If, however, there are no data locations following the last counted position, this is a signal that all the optimal pairs have been identified and the program proceeds on to the next phase, namely generating the residual data.

Figure 11:
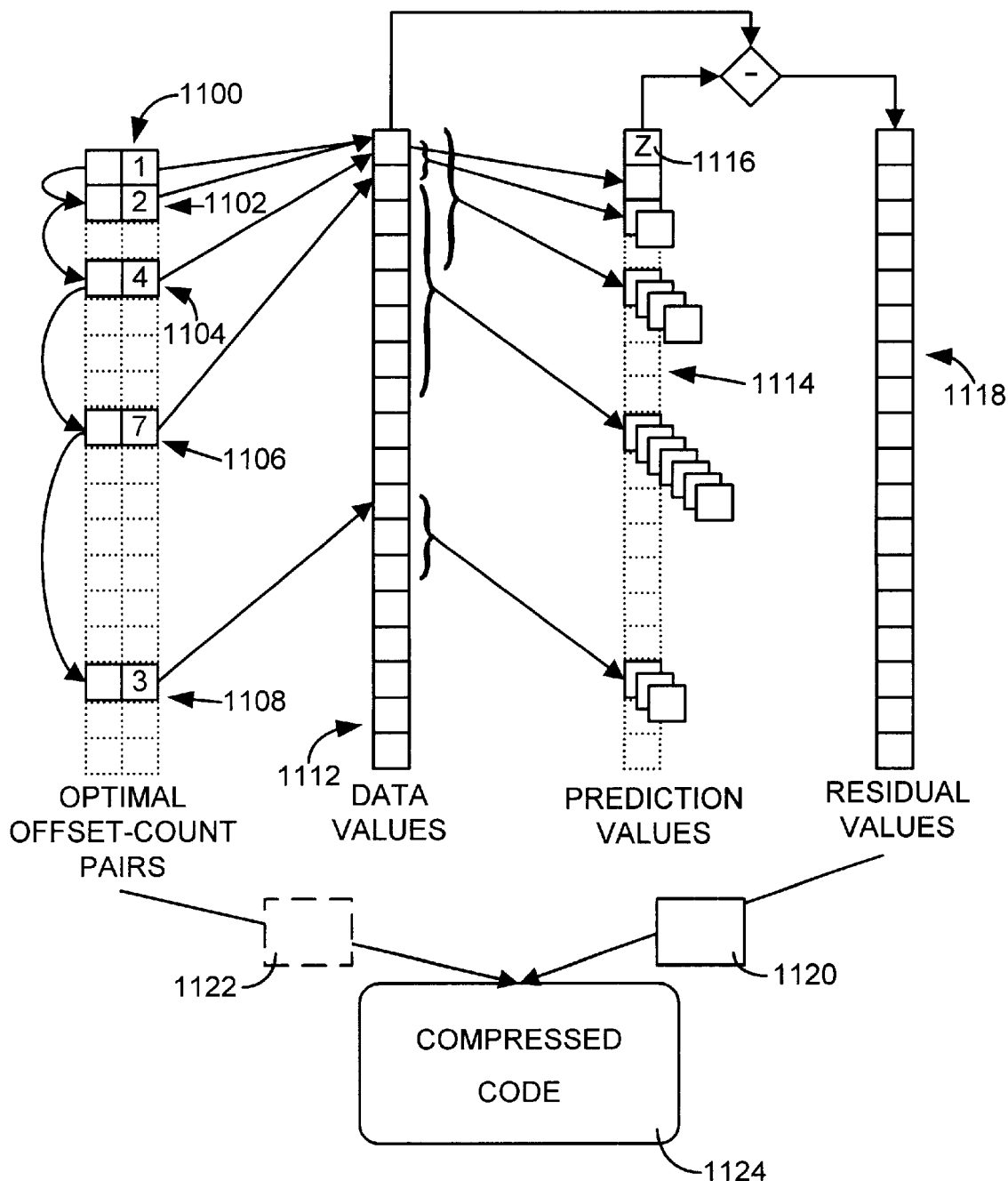
FIG. 11 is a diagram illustrating the generation of the series of optimal offset-count pairs and residual data via the process of FIGS. 10A through 10D.

Referring now to the right hand side of FIG. 11, the optimal offset-counter pairs are used to identify portions of the source data 1112, which are, in turn, used as generate a sequence of prediction values 1114. In addition, the prediction values include as a first element the aforementioned predetermined constant 1116, which is designated by "z" in this figure (and subsequent figures). There is a prediction value associated with each corresponding data value location in the source data 1112, beginning with the predetermined constant 1116 being associated with the first source data value and the remaining prediction values 1114 being sequentially associated with the remaining source data values 1112. Residual values 1118 are then computed by taking the difference between the source data values 1112 and their respective associated prediction values 1114.

The flow diagram of the aforementioned computer program is continued once again in FIG. 10D. This figure presents the portion of the program that implements the generation of the residual data as described above. This part of the program expands on the high-level step 404 of FIG. 4. In step 1028, a sequence of prediction values is generated. The sequence begins with the predetermined constant and continues with the blocks of source data identified by each successive optimal offset-count pair, starting with the first. The residual data is then computed in step 1030 by taking the difference between the source data values and the correspondingly located value of the of the prediction sequence.

Referring once again to the high-level flow diagram of FIG. 4, the next step 406 in the encoding process is to compress the residual values. Referring to the bottom portion of FIG. 11, this is done using a data compression module 1120 that preferably employs an entropy coding compression technique to compress the computed residual data. In addition, the offset-count pairs can optionally be compressed, as indicated in step 408 of FIG. 4. This is accomplish, as shown in FIG. 11, using a second data compression module 1122 employing one of the aforementioned compression techniques (either the same one as the first compression module 1120 or a different one). The offset-count pair compression step 408 in FIG. 4 and the second data compression module 1122 of FIG. 11, are shown in dashed lines to indicate their optional nature. While the offset-count pairs are likely to exhibit a reasonably low entropy, they will also typically be small in size and number and their compression may not significantly contribute to the overall compression ratio. Thus, in some applications of the present encoding process the extra resources required to compress the offset-count pairs may not be justified. In these cases, the offset-count pair compression step (408 of FIG. 4) and the compression module (1122 of FIG. 11) would preferably be eliminated. Finally, the optimal offset-count pairs, in compressed form or not, are combined with the compressed residual values to create the compressed code, as indicated by step 410 of FIG. 4. This compressed code 1124 (of FIG. 11) is in a form that can now be efficiently transmitted or stored.

Figure 12:
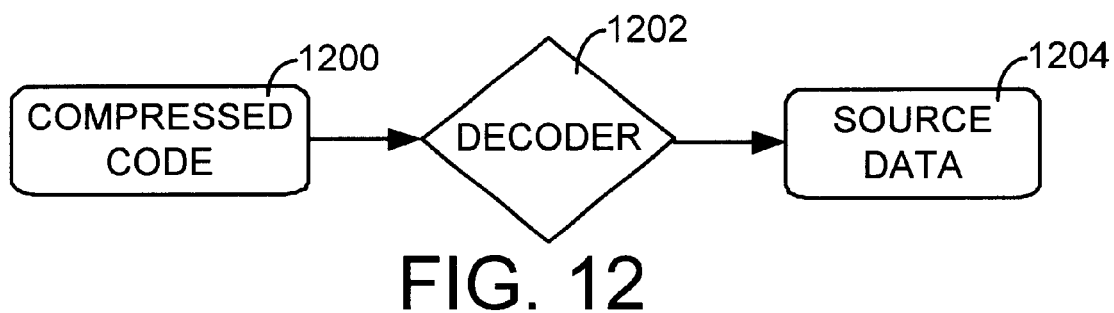
FIG. 12 is a diagram showing the basic architecture of the decoder portion of the data compression system of FIG. 2.

The original data values can be recovered from the compressed code by a decoding process that will now be described. In general, the decoding process entails first decompressing the compressed code, and then recovering the source code from the residual data and offset-count pairs. Thus, the decoding process is essentially the inverse transformation of the coding process. More specifically, as illustrated in FIG. 12, the compressed code 1200 is first decompressed using a decompression portion of the decoder module 1202. This entails using the appropriate decompression process to decompress the residual values. The appropriate decompression process will depend on the type of compression technique that was employed to compress the residual data. In addition, the decoder module 1202 decompresses the offset-count pairs in the same way, assuming the pairs were compressed in the encoding process. If not, the pairs pass through the decompression portion of the decoder module 1202 unchanged.

Figure 13:
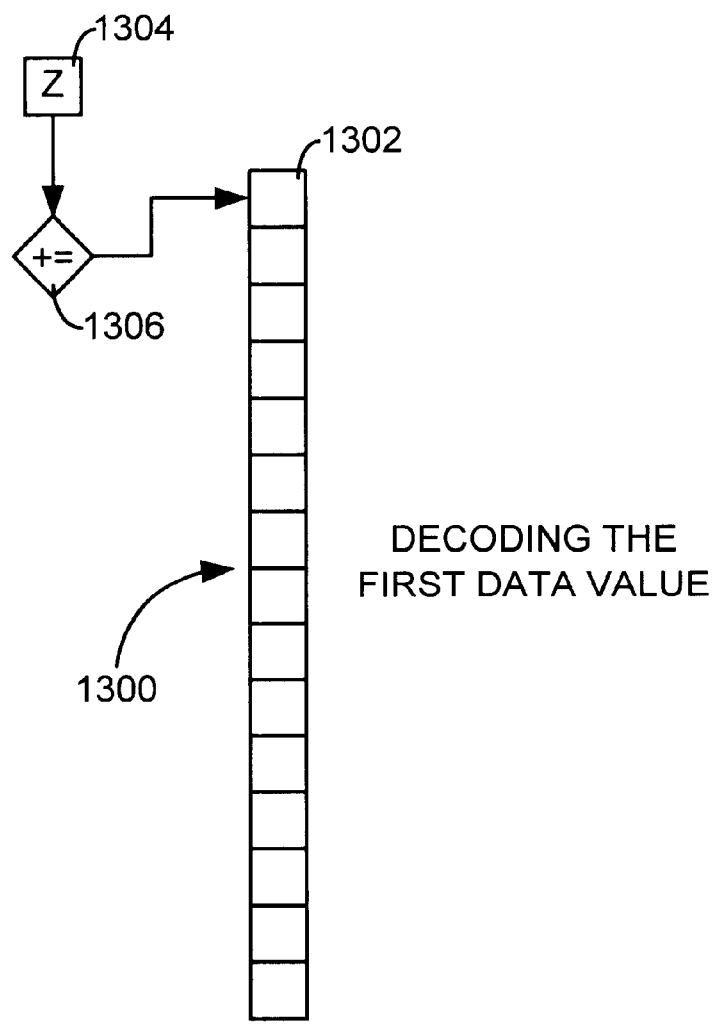
FIG. 13 is a diagram illustrating the production of the first data value in the recovered source data.

Once the compressed code 1200 has been decompressed, all the residual values generated in the encoding process and the optimal offset count pairs are recovered. These residual values and offset-count pairs are then converted back into an exact copy of the original source data 1204 using the decoder module 1202. The conversion process begins by decoding the first data value from the residual values 1300, as shown in FIG. 13 This is done by adding the first residual 1302 to the predetermined constant (z) 1304. The predetermined constant (z) 1304 is the same constant that was used in the encoding process to encode the first data value. Its value is either previously agreed upon and stored in both the encoder and decoder, or the value of the constant is transmitted to the decoder with or separate from the compressed code.

The result of the aforementioned addition is the first data value. In practice, memory requirements can be greatly reduced by doing this addition "in-place"—which means storing the result of the addition in the memory location previously used by the first residual value. This process is indicated in FIG. 13 by the "+=" operator 1106 commonly used in the C and C++ programming languages.

Figure 14:
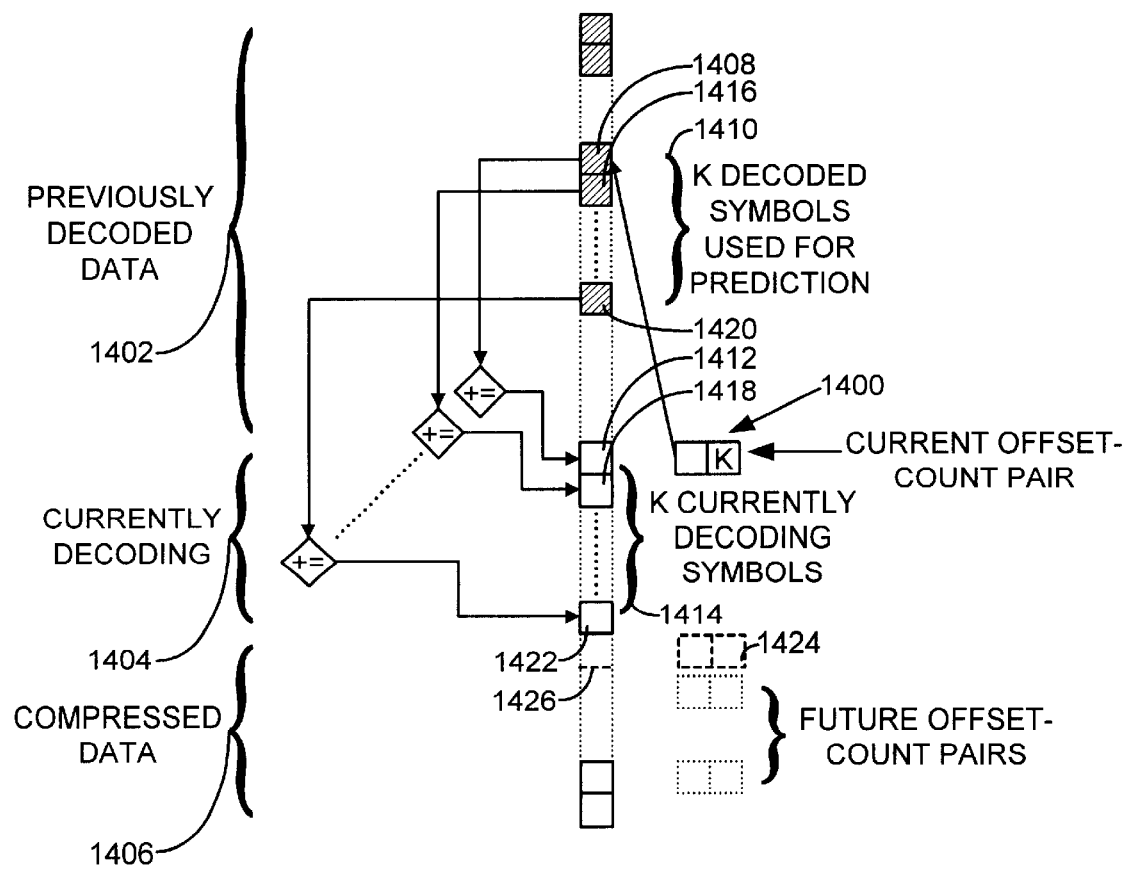
FIG. 14 is a diagram illustrating the decoding of an arbitrary block of residual data to produce a part of the recovered source data.

In general, subsequent data values are decoded by first finding the earlier occurring and previously decoded source data values indicated by each offset-count pair in sequence from the first to the last. As each block of earlier occurring source data indicated by an offset-count pair is identified, the data values are added in sequence to the residual values beginning at the residual value location associated with the offset-count pair then being processed. Once again to reduce the memory requirements of the system, the in-place addition technique is preferably employed, thus replacing each residual value in turn by the sum of the residual value and the appropriate earlier occurring source data value. The foregoing process is illustrated schematically in FIG. 14 for a block of K symbols (i.e., data values) as identified by an arbitrary offset-count pair 1400. As can be seen, FIG. 14 illustrates a region 1402 of previously decoded data in the upper portion, a region 1404 currently being decoded in the middle portion, and a region 1406 of encoded data at the bottom. The offset-count pair 1400 currently being processed identifies a data value location 1408 in the previously decoded data region 1402 corresponding to the beginning of a block of data 1410 K symbols long. The length of the block is defined by the count of the offset-count pair 1400. The data value associated with the first location 1408 is added to the residual value contained within the first residual value location 1412 in the K-long block of residuals 1414 associated with the offset-count pair 1400 being processed. This sum is then saved in the residual data location 1412 in place of the residual value that once resided therein. The data value associated with the second location 1416 of the block of earlier occurring source data 1410 is then added to the residual value contained within the second residual value location 1418 in the block of residuals 1414, and stored as a replacement for the residual. This process is repeated until the data value associated with the last location 1420 of the source data block 1410 is added to the residual value contained within the last residual value location 1422 in the block of residuals 1414. This last sum is preferably stored in the former residual value location 1422, as were the previous sums stored in their respective residual value locations. Theses sums represent the decoded source data. The decoding process then proceeds on to the next offset-count pair 1424, which is associated with the residual value location 1426 immediately following the last decoded data location (i.e., the former residual location 1422). The data is completely decoded and the original data values are recovered when all the offset-count pairs have been processed in the foregoing manner.

Figure 15A:
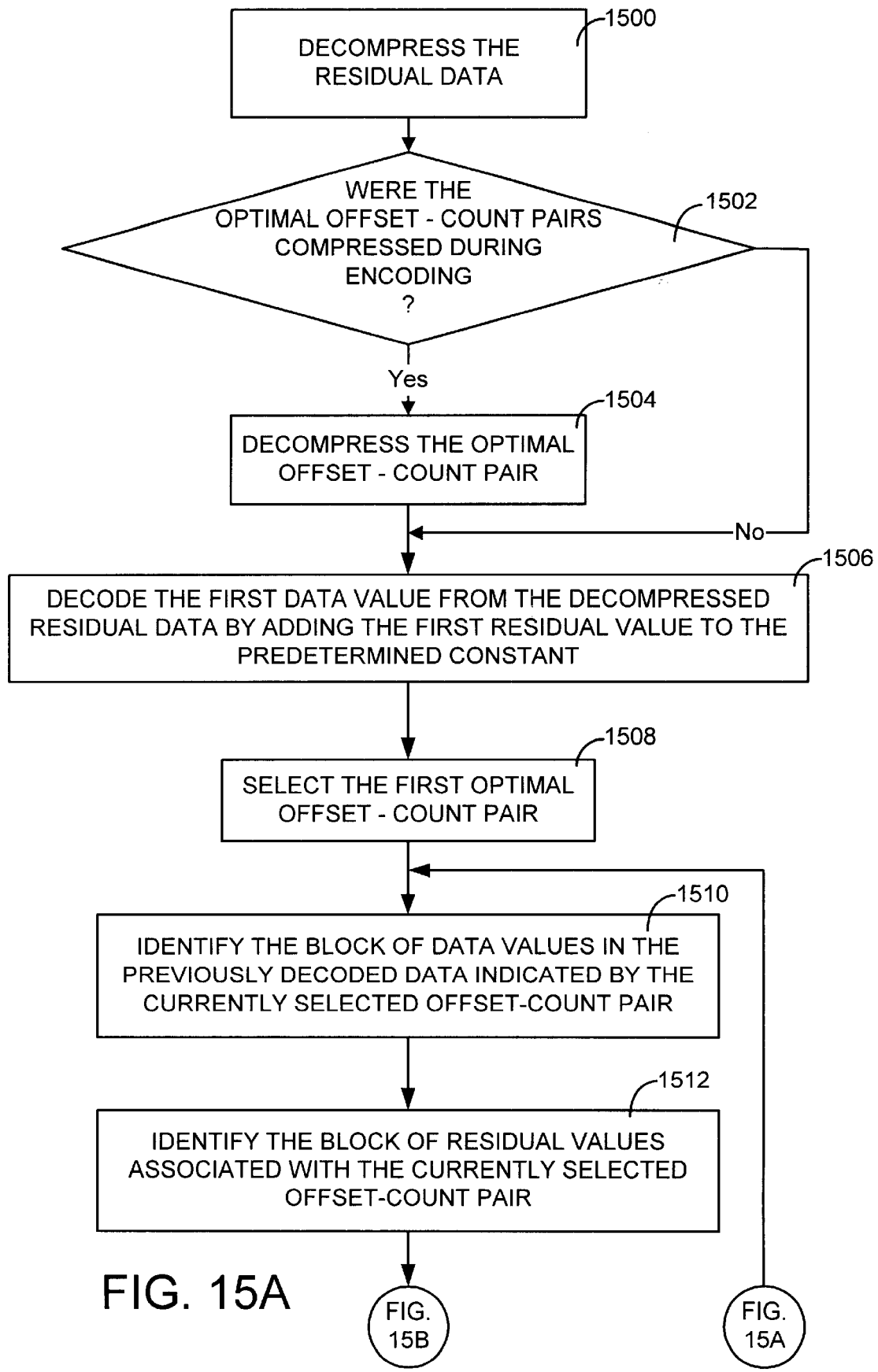
FIGS. 15A and 15B are flow diagrams showing the process for decoding the residual data and associated offset-count pairs to produce the recovered source data.
Figure 15B:
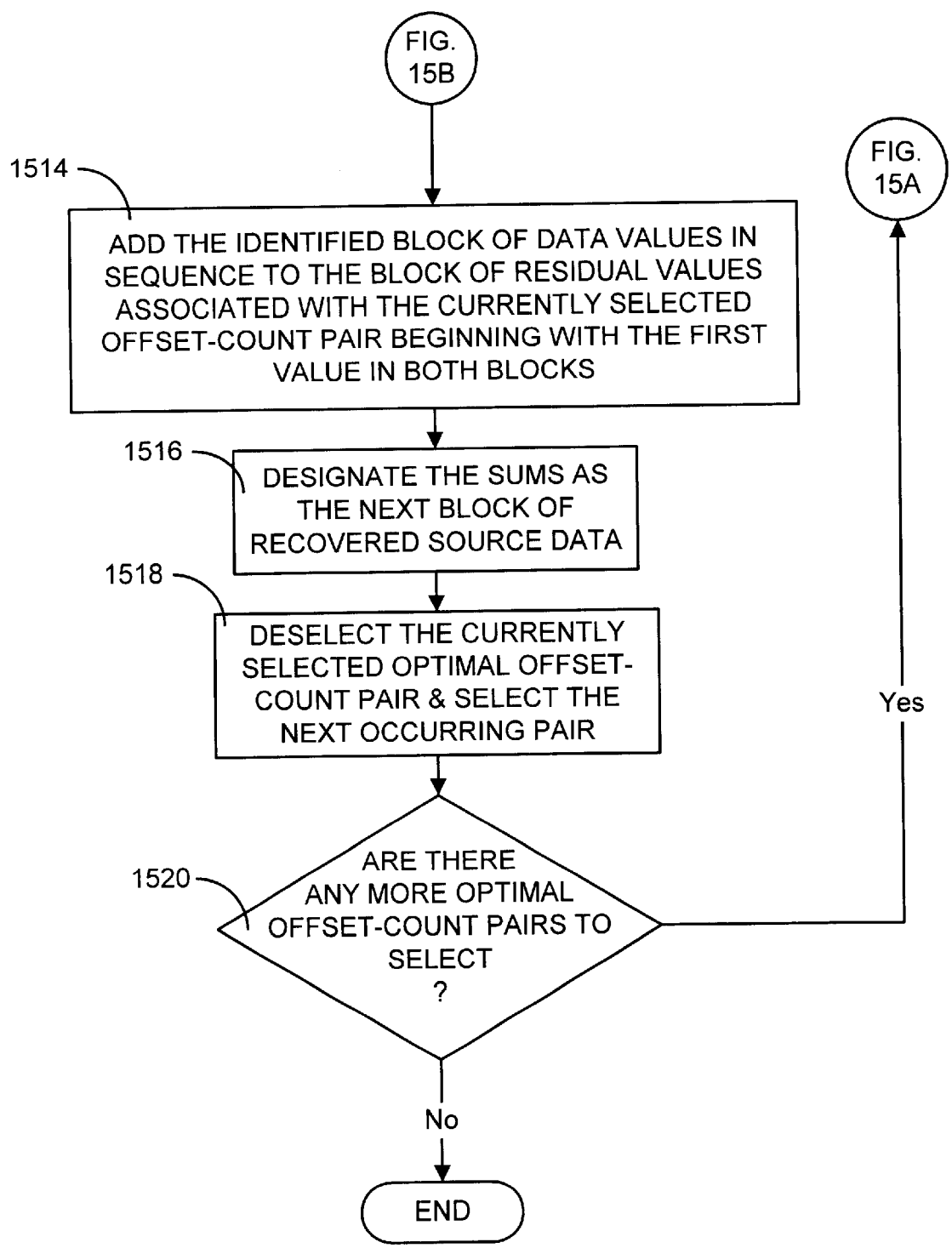

FIGS. 15A and 15B present a flow diagram of a computer program for implementing the decoding process described above. In step 1500 the residual data is decompressed via the appropriate decompression algorithm. If it is determined in step 1502 that the optimal offset-count pairs were compressed, then this data is decompressed as well in step 1504. If the offset-count pairs were not compressed then the process goes directly to step 1506 where the first data value is decoded by adding the first residual value to the predetermined constant. Next, in step 1508, the first of the optimal offset-count pairs is selected. A block of data values in the previously decoded data is identified using the first optimal offset-count pair (step 1510). This is accomplished, as it will be for all the rest of the offset-count pairs, by first counting back through the decoded data from the last decoded data location by the number locations indicated by the offset value of the currently selected offset-count pair (i.e. the first in this case) to identify the first data value of the block. Next, the block is completed using the previously decoded data values immediately following the identified first value up to the limit indicated by the count of the currently selected offset-count pair. The process continues with step 1512 where a block of residual values is identified using the currently selected offset-count pair. The residual data block constitutes those residual values immediately following the identified first value up to the limit indicated by the count of the currently selected offset-count pair. In step 1514, the identified block of previously decoded data values is added in sequence to the block of residual values associated with the currently selected offset-count pair (which in the case is the first pair) beginning with the first values in both blocks. The resulting sums are then designated in step 1516 as the next block of recovered source data. The currently selected optimal offset-count pair is deselected in step 1518, and the next occurring optimal offset-count pair is selected in its place. If it is determined in step 1520 that there is another offset-count pair to select, then steps 1510 through 1520 are repeated for this newly selected pair. If, however, it is determined that there are no more offset-count pairs to select, then the decoding process is deemed complete.

The foregoing technology is extremely useful in the many applications characterized by large data corpora, such as found when dealing with the compression of sound, images, and other natural signals. Multimedia products would especially benefit, because they contain a very large amount of data which is typically stored on a CD or DVD. It is important to note that when decoding the computational requirements are very small. Essentially, all that is required is one addition per offset-count pair to find the beginning of the earlier occurring data blocks used to decode a block of residuals, and one addition per resulting decoded data value. Thus, while the encoder algorithm is admittedly more computationally expensive, the decoding algorithm is fast and requires little computation. This circumstance lends itself particularly well to situations in which compression needs to be performed only once, but decompression will be performed many times. For example, when creating a CD, DVD or any other future write-once-read-many medium, the computational cost of compression (which need be done only once) is amortized over vast numbers of uses. Further, the use of a system and method embodying the present invention will not only reduce the number of discs required for a product (or, alternatively allow for larger products), but also result in faster execution time by reducing the amount of communication required with the (relatively slow) CD or DVD devices.

A computer program embodying many of the aspects of the present invention was coded in Matlab and C++ programming languages, and run on a conventional PC, such as the one described in connection with FIG. 1. The program in its coded form is storable on and can be executed from any appropriate storage medium, such as the hard disk, magnetic disk 29, optical disk 31, ROM,24 or RAM 25 (of FIG. 1). The program was also tested to evaluate its ability to compress source data and retrieve it losslessly. By way of an example, the following table lists the compression rates in bits per sample for a typical sound file (in this case, saxophone music) using the aforementioned computer program (which has been designated in Table 2 as DDBC) and various other commercially available compression programs.

TABLE 2

Bit rates on sound file test00.wav

| | |
|---|---|
| Raw Wav file | 16.001 |
| symbol entropy | 13.136 |
| DDBC | 7.726 |
| shorten | 8.198 |
| LZH | 13.856 |
| gzip | 13.960 |
| sq (CPM squeeze) | 14.544 |

It is noted that even though the coding method embodying the present invention does not utilize any prior information about the source data, it is able to surpass the performance of even "shorten" which is designed specifically for sound signals.

References

[LZ76] A. Lempel and J. Ziv. On the complexity of finite sequences. *IEEE Transactions on Information Theory*, Volume IT-22, 1976, pages 75–81.

[ZL77] J. Ziv and A. Lempel. A universal algorithm for sequential data compression. *IEEE Transactions on Information Theory*, Vol. IT-23, No. 3, May 1977, pages 337–343.

[Wel84] T. A. Welch. A technique for high performance data compression. *IEEE Computer*, 17(6), June 1984, pages 8–19.

[CW84] J. G. Cleary and I. H. Witten. Data compression using adaptive coding and partial string matching. *IEEE Transactions on Communications*, 32(4):396–402 April 1984.

[Mof90] A. Moffat. Implementing the PPM data compression scheme. *IEEE Transactions on Communications*, 38(11):1917–1921, November 1990.

What is claimed is:

1. A computer-implemented compression process for compressing source data comprising a series of data values associated with respective data locations of the source data, the compression process comprising using a computer to perform the following steps:

identifying mutually exclusive optimal blocks of data values within the source data having lengths that once processed will collectively result in the lowest overall cost for transmitting or storing the source data;

identifying a block of earlier occurring source data for each identified optimal block that when compared to the optimal block exhibits a minimal overall difference;

generating a series of pointers, each of which is assigned to a separate one of the optimal blocks, and each of which identifies the location and length of the block of earlier occurring source data associated with said separate one of the optimal blocks;

generating residual data comprising blocks of residual data values representing the difference between the data values in each corresponding data location of each optimal block and its associated block of earlier occurring source data starting with the first data location of both blocks;

compressing the residual data; and combining the compressed residual data and pointers to form a compressed code capable of being transmitted or stored.

2. The process of claim 1, wherein the step of compressing the residual data comprises the step of using an entropy-based compression scheme.

3. The process of claim 1, further comprising the step of compressing the series of pointers prior to the step of combining the, residual data and the pointers.

4. The process of claim 3, wherein the step of compressing the pointers comprises the step of using an entropy-based compression scheme.

5. The process of claim 3, wherein the step of combining the residual data and pointers comprises the steps of:

prior to compressing the residual data and series of pointers, assigning each pointer to a data location of the residual data that corresponds to the data location associated with the first data value of the optimal block to which the pointer was previously assigned; and after compressing the residual data and series of pointers, transmitting or storing the compressed series of pointers along with the compressed residual data.

6. The process of claim 1, wherein the step of identifying a block of earlier occurring source data for each identified optimal block comprises the step of identifying the closest block of earlier occurring source data whose difference exhibits the minimal overall entropy.

7. The process of claim 1, wherein each pointer comprises an offset-count pair which comprises:
   an offset value indicating the number of data locations preceding the first data location of an optimal block where the first data location of the block of earlier occurring source data associated with the optimal block can be found; and
   a count value indicating the number of data values there are in the block of earlier occurring source data.

8. The process of claim 1, wherein the steps of identifying mutually exclusive optimal blocks of source data values, identifying a block of earlier occurring source data for each identified optimal block, and generating a series of pointers are achieved in unison and comprise the steps of:
   (a) selecting the last source data location;
   (b) finding a best matching block of earlier occurring source data for every proposed block of source data, wherein a block of earlier occurring source data is best matching if a minimal overall difference is exhibited when it is compared to a proposed block of source data having the same number of data values, and wherein the proposed blocks of source data comprise blocks of every possible length that can be formed from consecutive source data values beginning at the selected source data location and ending at the last source data location;
   (c) determining the difference between correspondingly located data values of each proposed block and its associated best matching block;
   (d) generating an offset-count pair for each proposed block, each offset-count pair comprising an offset value indicating the number of data locations preceding the first data location of a proposed block where the first data location of the associated best matching block can be found and a count value indicating the number of data values in the best matching block;
   (e) calculating a total cost for each proposed block, wherein the total cost is indicative of the cost of transmitting or storing a proposed block and any data values following the proposed block in the source data;
   (f) determining which of the calculated total costs associated with the proposed blocks of the selected source data location is the least;
   (g) assigning the total cost determined to be the least to the currently selected data location as the minimum cost for that location;
   (h) assigning the offset-count pair associated with the proposed block having the minimum cost to the currently selected data location;
   (i) deselecting the currently selected source data location and selecting the source data location immediately preceding the last previously selected location; and
   (j) repeating steps (b) through (i) until the first source data location is selected, then proceeding to step (k);
   (k) designating the offset-count pair assigned to the second source data location as the first optimal offset-count pair;
   (l) identifying the source data location found by counting down through the source data the number of data locations identified by the count of the last previously designated optimal offset-count pair starting with the data location having the last previously designated offset-count pair assigned thereto;
   (m) designating the offset-count pair associated with the source data location immediately following the last counted location as the next optimal offset-pair; and,
   (n) repeating steps (l) and (m) until it is determined that there is no source data location immediately following the last counted location in step (m); wherein,
   (o) the designated optimal offset-count pairs correspond to said series of pointers, blocks of source data defined by counting down through the source data the number of data locations identified by the count of the optimal offset-count pairs starting with the data location having a offset-count pair assigned thereto correspond to said optimal blocks of source data, and the blocks of source data identified by the optimal offset-count pairs correspond to said blocks of earlier occurring source data associated with respective optimal blocks.

9. The process of claim 8, wherein the step of finding the best matching block of earlier occurring source data comprises, for each proposed block, the steps of:
   identifying every possible block of earlier occurring source data having the same length as a particular proposed block under consideration;
   generating a separate block of difference values for each possible block of earlier occurring source data by computing the difference between correspondingly located data values of the proposed block under consideration and each possible block of earlier occurring source data;
   computing a probability value for each difference value in each block of difference values, wherein the probability value represents a measure of how likely it is that a difference value falls within a prescribed distribution;
   computing a product of the probability values for each block of difference values;
   identifying the largest of all the probability value products;
   designating the block of earlier occurring source data having the product identified as the largest to be the best matching block of earlier occurring source data for the proposed block under consideration.

10. The process of claim 9, wherein the prescribed distribution is a double-sided exponential distribution exhibiting-a substantially kurtotic nature in that the distribution gives a higher probability to values centered around zero.

11. The process of claim 9, wherein the prescribed distribution is a double-sided exponential distribution exhibiting a substantially kurtotic nature in that the distribution gives a higher probability to values centered around zero.

12. The process of claim 8, wherein the step of finding the best matching block of earlier occurring source data comprises, for each proposed block, the steps of:
   (aa) identifying and selecting the closest block of earlier occurring source data having the same length as a particular proposed block under consideration for encoding;
   (bb) generating a block of difference values for the currently selected block of earlier occurring source data by computing the difference between correspondingly located data values of the proposed block under consideration and the currently selected block of earlier occurring source data;
   (cc) computing a probability value for each difference value in the currently generated block of difference values, wherein the probability value represents a measure of how likely it is that a difference value falls within a prescribed distribution;

(dd) computing a product of the probability values associated with the currently generated block of difference values to produce an overall probability value for the currently selected block of earlier occurring source data;

(ee) comparing the overall probability value computed for the currently selected block of earlier occurring source data to a prescribed threshold probability;

(ff) deselecting the currently selected block of earlier occurring source data, and identifying and selecting the next closest block of earlier occurring source data having the same length as the proposed block to be the currently selected block of earlier occurring source data, whenever the prescribed threshold probability is not exceeded by the overall probability value computed for the previously selected block of earlier occurring source data;

(gg) repeating steps (bb) through (ff) for each newly selected block of earlier occurring source data; and (hh) designating the currently selected block of earlier occurring source data to be the best matching block of earlier occurring source data for the proposed block under consideration for encoding, whenever the prescribed threshold probability is exceeded by the overall probability value computed for the currently selected block of earlier occurring source data.

13. The process of claim 8, wherein the step of calculating the total cost for each proposed block comprises the steps of:

computing a cost associated with transmitting or storing the offset-count pair generated for the proposed block;

computing a cost associated with transmitting or storing each difference value determined between the correspondingly located data values the proposed block and its associated best matching block;

ascertaining the minimum cost associated with transmitting or storing any remaining data values following the proposed block in the source data; and, computing a sum of the cost associated with transmitting or storing the offset-count pair, the cost associated with transmitting or storing each difference value, and the minimum cost associated with transmitting or storing any remaining data values following the proposed block in the source data.

14. The process of claim 1, wherein the step of generating residual data comprises the steps of:

generating a sequence of prediction values beginning with a predetermined constant and followed by successive blocks of source data values, wherein the successive blocks of source data comprise the blocks of earlier occurring source data specified by the series of pointers, and wherein the successive blocks are arranged in an order corresponding to the order of the series of pointers beginning with the first one thereof;

computing the residual data by taking the difference between corresponding data locations of the source data and the sequence of prediction values starting with the first data location of each.

15. The process of claim 14, wherein the predetermined constant comprises a mean of the source data values.

16. The process of claim 1, wherein the step of combining the residual data and pointers comprises the steps of:

prior to compressing the residual data, assigning each pointer to a data location of the residual data that corresponds to the data location associated with the first data value of the optimal block to which.the pointer was previously assigned; and after compressing the residual data, transmitting or storing the series of pointers along with the compressed residual data.

17. The process of claim 16, further comprising the step of decompressing the compressed source data into recovered source data which is identical to the original source data.

18. The process of claim 17, wherein the decompressing step comprises:

decompressing the residual data;

producing the recovered source data from the decompressed residual data and pointers.

19. The process of claim 18, wherein each pointer is an offset-count pair comprising an offset value defining an offset to an earlier occurring data location and a count value defining a number of data values in a block of data, and wherein the step of producing the recovered source code from the decompressed residual data and pointers comprises the steps of:

(a) decoding the first data value of the recovered source code from the decompressed residual data by adding the first value of the residual data to a predetermined constant;

(b) selecting the first occurring offset-count pair;

(c) identifying a block of data values in the previously decoded data by, first counting back through the decoded data from the last decoded data location by the number locations indicated by the offset value of the currently selected offset-count pair to identify the first data value of the block, and then completing the block using the previously decoded data values immediately following the first value up to a limit indicated by the count value of the currently selected offset-count pair;

(d) identifying a block of residual values comprised of the residual values associated with residual data locations starting at and following the residual data location to which the currently selected offset-count pair is assigned up to a limit indicated by the count value of the currently selected pair;

(e) adding the data values of the identified block of previously decoded data values in sequence to the correspondingly located values of the identified block of residual values beginning with the first value in both blocks;

(f) designating the sums as the next occurring block of recovered source data;

(g) deselecting the currently selected offset-count pair and selecting the next occurring pair;

(h) repeating steps (c) through (g) until there is no next occurring offset-count pair to select.

20. The process of claim 19 further comprising the step of compressing the offset-count pairs prior to the step combining the residual data and the offset-count pairs, and wherein prior to the step of producing the recovered source code, the offset-count pairs are decompressed.

21. The process of claim 19, wherein the predetermined constant comprises a mean of the original source data values.

22. The process of claim 19, wherein the data values of the decompressed residual data are stored in individual storage locations, and wherein the step of designating the sums as the next occurring block of recovered source data comprises the step of replacing each value of each identified block of residual data values in its storage location with the values associated with the blocks of recovered source data to reduce storage requirements.

23. A data compression system for compressing source data made up of a series of data values associated with respective data locations of the source data, the system comprising:

a general purpose computing device; and a computer program comprising program modules executable by the computing device, wherein the computing device is directed by the program modules of the computer program to, identify-mutually exclusive optimal blocks of data values within the source data having lengths that once processed will collectively result in the lowest overall cost for transmitting or storing the source data, identify a block of earlier occurring source data for each identified optimal block that when compared to the optimal block exhibits a minimal overall difference, generate a series of pointers, each of which is assigned to a separate one of the optimal blocks, and each of which identifies the location and length of the block of earlier occurring source data associated with said separate one of the optimal blocks, generate residual data comprising blocks of residual data values representing the difference between the data values in each corresponding data location of each optimal block and its associated block of earlier occurring source data starting with the first data location of both blocks, compress the residual data, and combine the compressed residual data and pointers to form a compressed code capable of being transmitted or stored.

24. The system of claim 23, wherein the wherein the program module for compressing the residual data comprises using an entropy-based compression scheme.

25. The system of claim 23, further comprising a program module for compressing the series of pointers prior to performing the program module for combining the residual data and the pointers.

26. The system of claim 25, wherein the program module for compressing the pointers comprises using an entropy-based compression scheme.

27. The system of claim 23, wherein the program module for identifying a block of earlier occurring source data for each identified optimal block comprises a sub-module for identifying the closest block of earlier occurring source data whose difference exhibits the minimal overall entropy.

28. The system of claim 23, wherein each pointer comprises an offset-count pair which comprises:

an offset value indicating the number of data locations preceding the first data location of an optimal block where the first data location of the block of earlier occurring source data associated with the optimal block can be found; and a count value indicating the number of data values there are in the block of earlier occurring source data.

29. The system of claim 23, wherein the program modules for identifying mutually exclusive optimal blocks of source data values, identifying a block of earlier occurring source data for each identified optimal block, and generating a series of pointers are performed in unison and comprise sub-modules for:

(a) selecting the last source data location;

(b) finding a best matching block of earlier occurring source data for every proposed block of source data, wherein a block of earlier occurring source data is best matching if a minimal overall difference is exhibited when it is compared to a proposed block of source data having the same number of data values, and wherein the proposed blocks of source data comprise blocks of every possible length that can be formed from consecutive source data values beginning at the selected source data location and ending at the last source data location;

(c) determining the difference between correspondingly located data values of each proposed block and its associated best matching block;

(d) generating an offset-count pair for each proposed block, each offset-count pair comprising an offset value indicating the number of data locations preceding the first data location of a proposed block where the first data location of the associated best matching block can be found and a count value indicating the number of data values in the best matching block;

(e) calculating a total cost for each proposed block, wherein the total cost is indicative of the cost of transmitting or storing a proposed block and any data values following the proposed block in the source data;

(f) determining which of the calculated total costs associated with the proposed blocks of the selected source data location is the least;

(g) assigning the total cost determined to be the least to the currently selected data location as the minimum cost for that location;

(h) assigning the offset-count pair associated with the proposed block having the minimum cost to the currently selected data location;

(i) deselecting the currently selected source data location and selecting the source data location immediately preceding the last previously selected location; and (j) repeating steps (b) through (i) until the first source data location is selected, then proceeding to step (k);

(k) designating the offset-count pair assigned to the second source data location as the first optimal offset-count pair;

(l) identifying the source data location found by counting down through the source data the number of data locations identified by the count of the last previously designated optimal offset-count pair starting with the data location having the last previously designated offset-count pair assigned thereto;

(m) designating the offset-count pair associated with the source data location immediately following the last counted location as the next optimal offset-pair; and, (n) repeating steps (l) and (m) until it is determined that there is no source data location immediately following the last counted location in step (m); wherein, (o) the designated optimal offset-count pairs correspond to said series of pointers, blocks of source data defined by counting down through the source data the number of data locations identified by the count of the optimal offset-count pairs starting with the data location having a offset-count pair assigned thereto correspond to said optimal blocks of source data, and the blocks of source data identified by the optimal offset-count pairs correspond to said blocks of earlier occurring source data associated with respective optimal blocks.

30. The system of claim 29, wherein the sub-module for finding the best matching block of earlier occurring source data comprises, for each proposed block, sub-modules for:

identifying every possible block of earlier occurring source data having the same length as a particular proposed block under consideration;

generating a separate block of difference values for each possible block of earlier occurring source data by computing the difference between correspondingly located data values of the proposed block under consideration and each possible block of earlier occurring source data;

computing a probability value for each difference value in each block of difference values, wherein the probability value represents a measure of how likely it is that a difference value falls within a prescribed distribution;

computing a product of the probability values for each block of difference values;

identifying the largest of all the probability value products;

designating the block of earlier occurring source data having the product identified as the largest to be the best matching block of earlier occurring source data for the proposed block under consideration.

31. The system of claim 30, wherein the prescribed distribution is a double-sided exponential distribution exhibiting a substantially kurtotic nature in that the distribution gives a higher probability to values centered around zero.

32. The system of claim 30, wherein the prescribed distribution is a double-sided exponential distribution exhibiting a substantially kurtotic nature in that the distribution gives a higher probability to values centered around zero.

33. The system of claim 25, wherein the program module for combining the residual data and pointers comprises sub-modules for:

prior to compressing the residual data and series of pointers, assigning each pointer to a data location of the residual data that corresponds to the data location associated with the first data value of the optimal block to which the pointer was previously assigned; and after compressing the residual data and series of pointers, transmitting or storing the compressed series of pointers along with the compressed residual data.

34. The system of claim 29, wherein the sub-module for finding the best matching block of earlier occurring source data comprises, for each proposed block, sub-modules for:

(aa) identifying and selecting the closest block of earlier occurring source data having the same length as a particular proposed block under consideration for encoding;

(bb) generating a block of difference values for the currently selected block of earlier occurring source data by computing the difference between correspondingly located data values of the proposed block under consideration and the currently selected block of earlier occurring source data;

(cc) computing a probability value for each difference value in the currently generated block of difference values, wherein the probability value represents a measure of how likely it is that a difference value falls within a prescribed distribution;

(dd) computing a product of the probability values associated with the currently generated block of difference values to produce an overall probability value for the currently selected block of earlier occurring source data;

(ee) comparing the overall probability value computed for the currently selected block of earlier occurring source data to a prescribed threshold probability;

(ff) deselecting the currently selected block of earlier occurring source data, and identifying and selecting the next closest block of earlier occurring source data having the same length as the proposed block to be the currently selected block of earlier occurring source data, whenever the prescribed threshold probability is not exceeded by the overall probability value computed for the previously selected block of earlier occurring source data;

(gg) repeating steps (bb) through (ff) for each newly selected block of earlier occurring source data; and (hh) designating the currently selected block of earlier occurring source data to be the best matching block of earlier occurring source data for the proposed block under consideration for encoding, whenever the prescribed threshold probability is exceeded by the overall probability value computed for the currently selected block of earlier occurring source data.

35. The system of claim 29, wherein the sub-module for calculating the total cost for each proposed block comprises sub-modules for:

computing a cost associated with transmitting or storing the offset-count pair generated for the proposed block;

computing a cost associated with transmitting or storing each difference value determined between the correspondingly located data values the proposed block and its associated best matching block;

ascertaining the minimum cost associated with transmitting or storing any remaining data values following the proposed block in the source data; and, computing a sum of the cost associated with transmitting or storing the offset-count pair, the cost associated with transmitting or storing each difference value, and the minimum cost associated with transmitting or storing any remaining data values following the proposed block in the source data.

36. The system of claim 23, wherein the program module for generating residual data comprises sub-modules for:

generating a sequence of prediction values beginning with a predetermined constant and followed by successive blocks of source data values, wherein the successive blocks of source data comprise the blocks of earlier occurring source data specified by the series of pointers, and wherein the successive blocks are arranged in an order corresponding to the order of the series of pointers beginning with the first one thereof;

computing the residual data by taking the difference between corresponding data locations of the source data and the sequence of prediction values starting with the first data location of each.

37. The system of claim 36, wherein the predetermined constant comprises a mean of the source data values.

38. The system of claim 23, wherein the program module for combining the residual data and pointers comprises sub-modules for:

prior to compressing the residual data, assigning each pointer to a data location of the residual data that corresponds to the data location associated with the first data value of the optimal block to which the pointer was previously assigned; and after compressing the residual data, transmitting or storing the series of pointers along with the compressed residual data.

39. The system of claim 38, further comprising a program module for decompressing the compressed source data into recovered source data which is identical to the original source data.

40. The system of claim 39, wherein the program module for decompressing the compressed source data comprises sub-modules for:

decompressing the residual data;

producing the recovered source data from the decompressed residual data and pointers.

41. The system of claim 40, wherein each pointer is an offset-count pair comprising an offset value defining an offset to an earlier occurring data location and a count value defining a number of data values in a block of data, and wherein the sub-module for producing the recovered source code from the decompressed residual data and pointers comprises sub-modules for:

(a) decoding the first data value of the recovered source code from the decompressed residual data by adding the first value of the residual data to a predetermined constant;

(b) selecting the first occurring offset-count pair;

(c) identifying a block of data values.in the previously decoded data by, first counting back through the decoded data from the last decoded data location by the number locations indicated by the offset value of the currently selected offset-count pair to identify the first data value of the block, and then completing the block using the previously decoded data values immediately following the first value up to a limit indicated by the count value of the currently selected offset-count pair;

(d) identifying a block of residual values comprised of the residual values associated with residual data locations starting at and following the residual data location to which the currently selected offset-count pair is assigned up to a limit indicated by the count value of the currently selected pair;

(e) adding the data values of the identified block of previously decoded data values in sequence to the correspondingly located values of the identified block of residual values beginning with the first value in both blocks;

(f) designating the sums as the next occurring block of recovered source data;

(g) deselecting the currently selected offset-count pair and selecting the next occurring pair;

(h) repeating steps (c) through (g) until there is no next occurring offset-count pair to select.

42. The system of claim 41 further comprising a program module for compressing the offset-count pairs performed prior to the program module for combining the residual data and the offset-count pairs, and wherein prior to performing the sub-module for producing the recovered source code, the offset-count pairs are decompressed.

43. The system of claim 41, wherein the predetermined constant comprises a mean of the original source data values.

44. The system of claim 41, wherein the data values of the decompressed residual data are stored in individual storage locations, and wherein the sub-module for designating the sums as the next occurring block of recovered source data comprises a sub-module for replacing each value of each identified block of residual data values in its storage location with the values associated with the blocks of recovered source data to reduce storage requirements.

45. A computer-readable memory for compressing source data made up of a series of data values associated with respective data locations of the source data, the memory comprising:

a computer-readable storage medium; and a computer program comprising program modules stored in the storage medium, wherein the storage medium is so configured by the computer program that it causes the computer to, identify mutually exclusive optimal blocks of data values within the source data having lengths that once processed will collectively result in the lowest overall cost for transmitting or storing the source data, identify a block of earlier occurring source data for each identified optimal block that when compared to the optimal block exhibits a minimal overall difference, generate a series of pointers, each of which is assigned to a separate one of the optimal blocks, and each of which identifies the location and length of the block of earlier occurring source data associated with said separate one of the optimal blocks, generate residual data comprising blocks of residual data values representing the difference between the data values in each corresponding data location of each optimal block and its associated ed block of earlier occurring source data starting with the first data location of both blocks, compress the residual data, and combine the compressed residual data and pointers to form a compressed code capable of being transmitted or stored.

46. The computer-readable memory of claim 45, wherein the wherein the program module for compressing the residual data comprises using an entropy-based compression scheme.

47. The computer-readable memory of claim 45, further comprising a program module for compressing the series of pointers prior to performing the program module for combining the residual data and the pointers.

48. The computer-readable memory of claim 47, wherein the program module for compressing the pointers comprises using an entropy-based compression scheme.

49. The computer-readable memory of claim 47, wherein the program module for combining the residual data and pointers comprises sub-modules for:

prior to compressing the residual data and series of pointers, assigning each pointer to a data location of the residual data that corresponds to the data location associated with the first data value of the optimal block to which the pointer was previously assigned; and after compressing the residual data and series of pointers, transmitting or storing the compressed series of pointers along with the compressed residual data.

50. The computer-readable memory of claim 45, wherein the program module for identifying a block of earlier occurring source data for each identified optimal block comprises a sub-module for identifying the closest block of earlier occurring source data whose difference exhibits the minimal overall entropy.

51. The computer-readable memory of claim 45, wherein each pointer comprises an offset-count pair which comprises:

an offset value indicating the number of data locations preceding the first data location of an optimal block where the first data location of the block of earlier occurring source data associated with the optimal block can be found; and a count value indicating the number of data values there are in the block of earlier occurring source data.

52. The computer-readable memory of claim 45, wherein the program modules for identifying mutually exclusive optimal blocks of source data values, identifying a block of earlier occurring source data for each identified optimal block, and generating a series of pointers are performed in unison and comprise sub-modules for:

(a) selecting the last source data location;

(b) finding a best matching block of earlier occurring source data for every proposed block of source data, wherein a block of earlier occurring source data is best matching if a minimal overall difference is exhibited when it is compared to a proposed block of source data having the same number of data values, and wherein the proposed blocks of source data comprise blocks of every possible length that can be formed from consecutive source data values beginning at the selected source data location and ending at the last source data location;

(c) determining the difference between correspondingly located data values of each proposed block and its associated best matching block;

(d) generating an offset-count pair for each proposed block, each offset-count pair comprising an offset value indicating the number of data locations preceding the first data location of a proposed block where the first data location of the associated best matching block can be found and a count value indicating the number of data values in the best matching block;

(e) calculating a total cost for each proposed block, wherein the total cost is indicative of the cost of transmitting or storing a proposed block and any data values following the proposed block in the source data;

(f) determining which of the calculated total costs associated with the proposed blocks of the selected source data location is the least;

(g) assigning the total cost determined to be the least to the currently selected data location as the minimum cost for that location;

(h) assigning the offset-count pair associated with the proposed block having the minimum cost to the currently selected data location;

(i) deselecting the currently selected source data location and selecting the source data location immediately preceding the last previously selected location; and (j) repeating steps (b) through (i) until the first source data location is selected, then proceeding to step (k);

(k) designating the offset-count pair-assigned to the second source data location as the first optimal offset-count pair;

(l) identifying the source data location found by counting down through the source data the number of data locations identified by the count of the last previously designated optimal offset-count pair starting with the data location having the last previously designated offset-count pair assigned thereto;

(m) designating the offset-count pair associated with the source data location immediately following the last counted location as the next optimal offset-pair; and, (n) repeating steps (l) and (m) until it is determined that there is no source data location immediately following the last counted location in step (m); wherein, (o) the designated optimal offset-count pairs correspond to said series of pointers, blocks of source data defined by counting down through the source data the number of data locations identified by the count of the optimal offset-count pairs starting with the data location having a offset-count pair assigned thereto correspond to said optimal blocks of source data, and the blocks of source data identified by the optimal offset-count pairs correspond to said blocks of earlier occurring source data associated with respective optimal blocks.

53. The computer-readable memory of claim 52, wherein the sub-module for finding the best matching block of earlier occurring source data comprises, for each proposed block, sub-modules for:

identifying every possible block of earlier occurring source data having the same length as a particular proposed block.under consideration;

generating a separate block of difference values for each possible block of earlier occurring source data by computing the difference between correspondingly located data values of the proposed block under consideration and each possible block of earlier occurring source data;

computing a probability value for each difference value in each block of difference values, wherein the probability value represents a measure of how likely it is that a difference value falls within a prescribed distribution;

computing a product of the probability values for each block of difference values;

identifying, the largest of all the probability value products;

designating the block of earlier occurring source data having the product identified as the largest to be the best matching block of earlier occurring source data for the proposed block under consideration.

54. The computer-readable memory of claim 53, wherein the prescribed distribution is a double-sided exponential distribution exhibiting a substantially kurtotic nature in that the distribution gives a higher probability to values centered around zero.

55. The computer-readable memory of claim 53, wherein the prescribed distribution is a double-sided exponential distribution exhibiting a substantially kurtotic nature in that the distribution gives a higher probability to values centered around zero.

56. The computer-readable memory of claim 52, wherein the sub-module for finding the best matching block of earlier occurring source data comprises, for each proposed block, sub-modules for:

(aa) identifying and selecting the closest block of earlier occurring source data having the same length as a particular proposed block under consideration for encoding;

(bb) generating a block of difference values for the currently selected block of earlier occurring source data by computing the difference between correspondingly located data values of the proposed block under consideration and the currently selected block of earlier occurring source data;

(cc) computing a probability value for each difference value in the currently generated block of difference values, wherein the probability value represents a measure of how likely it is that a difference value falls within a prescribed distribution;

(dd) computing a product of the probability values associated with the currently generated block of difference values to produce an overall probability value for the currently selected block of earlier occurring source data;

(ee) comparing the overall probability value computed for the currently selected block of earlier occurring source data to a prescribed threshold probability;

(ff) deselecting the currently selected block of earlier occurring source data, and identifying and selecting the next closest block of earlier occurring source data having the same length as the proposed block to be the currently selected block of earlier occurring source data, whenever the prescribed threshold probability is not exceeded by the overall probability value computed for the previously selected block of earlier occurring source data;

(gg) repeating steps (bb) through (ff) for each newly selected block of earlier occurring source data; and (hh) designating the currently selected block of earlier occurring source data to be the best matching block of earlier occurring source data for the proposed block under consideration for encoding, whenever the prescribed threshold probability is exceeded by the overall probability value computed for the currently selected block of earlier occurring source data.

57. The computer-readable memory of claim 52, wherein the sub-module for calculating the total cost for each proposed block comprises sub-modules for:

computing a cost associated with transmitting or storing the offset-count pair generated for the proposed block;

computing a cost associated with transmitting or storing each difference value determined between the correspondingly located data values the proposed block and its associated best matching block;

ascertaining the minimum cost associated with transmitting or storing any remaining data values following the proposed block in the source data; and, computing a sum of the cost associated with transmitting or storing the offset-count pair, the cost associated with transmitting or storing each difference value, and the minimum cost associated with transmitting or storing any remaining data values following the proposed block in the source data.

58. The computer-readable memory of claim 45, wherein the program module for generating residual data comprises sub-modules for:

generating a sequence of prediction values beginning with a predetermined constant and followed by successive blocks of source data values, wherein the successive blocks of source data comprise the blocks of earlier occurring source data specified by the series of pointers, and wherein the successive blocks are arranged in an order corresponding to the order of the series of pointers beginning with the first one thereof;

computing the residual data by taking the difference between corresponding data locations of the source data and the sequence of prediction values starting with the first data location of each.

59. The computer-readable memory of claim 58, wherein the predetermined constant comprises a mean of the source data values.

60. The computer-readable memory of claim 45, wherein the program module for combining the residual data and pointers comprises sub-modules for:

prior to compressing the residual data, assigning each pointer to a data location of the residual data that corresponds to the data location associated with the first data value of the optimal block to which the pointer was previously assigned; and after compressing the residual data, transmitting or storing the series of pointers along with the compressed residual data.

61. The computer-readable memory of claim 60, further comprising a program module for decompressing the compressed source data into recovered source data which is identical to the original source data.

62. The computer-readable memory of claim 61, wherein the program module for decompressing the compressed source data comprises sub-modules for:

decompressing the residual data;

producing the recovered source data from the decompressed residual data and pointers.

63. The computer-readable memory of claim 62, wherein each pointer is an offset-count pair comprising an offset value defining an offset to an earlier occurring data location and a count value defining a number of data values in a block of data, and wherein the sub-module for producing the recovered source code from the decompressed residual data and pointers comprises sub-modules for:

(a) decoding the first data value of the recovered source code from the decompressed residual data by adding the first value of the residual data to a predetermined constant;

(b) selecting the first occurring offset-count pair;

(c) identifying a block of data values in the previously decoded data by, first counting back through the decoded data from the last decoded data location by the number locations indicated by the offset value of the currently selected offset-count pair to identify the first data value of the block, and then completing the block using the previously decoded data values immediately following the first value up to a limit indicated by the count value of the currently selected offset-count pair;

(d) identifying a block of residual values comprised of the residual values associated with residual data locations starting at and following the residual data location to which the currently selected offset-count pair is assigned up to a limit indicated by the count value of the currently selected pair;

(e) adding the data values of the identified block of previously decoded data values in sequence to the correspondingly located values of the identified block of residual values beginning with the first value in both blocks;

(f) designating the sums as the next occurring block of recovered source data;

(g) deselecting the currently selected offset-count pair and selecting the next occurring pair;

(h) repeating steps (c) through (g) until there is no next occurring offset-count pair to select.

64. The computer-readable memory of claim 63 further comprising a program module for compressing the offset-count pairs performed prior to the program module for combining the residual data and the offset-count pairs, and wherein prior to performing the sub-module for producing the recovered source code, the offset-count pairs are decompressed.

65. The computer-readable memory of claim 63, wherein the predetermined constant comprises a mean of the original source data values.

66. The computer-readable memory of claim 63, wherein the data values of the decompressed residual data are stored in individual storage locations, and wherein the sub-module for designating the sums as the next occurring block of recovered source data comprises a sub-module for replacing each value of each identified block of residual data values in its storage location with the values associated with the blocks of recovered source data to reduce storage requirements.

67. A computer-implemented process for converting encoded source data into recovered source data that is identical to the original source data, wherein the encoded source data comprises compressed residual data, and a series of pointers with each pointer having been assigned to a unique data location of the residual data prior to the residual data being compressed and comprising an offset-count pair having an offset value defining an offset to an earlier occurring data location and a count value defining a number of data values in a block of data, said conversion process comprising using a computer to perform the following steps:

(a) decompressing the residual data;
(b) decoding the first data value of the recovered source code from the decompressed residual data by adding the first value of the residual data to a predetermined constant;
(c) selecting the first occurring offset-count pair;
(d) identifying a block of data values in the previously decoded data by, first counting back through the decoded data from the last decoded data location by the number locations indicated by the offset value of the currently selected offset-count pair to identify the first data value of the block, and then completing the block using the previously decoded date values immediately following the first value up to a limit indicated by the count value of the currently selected offset-count pair;
(e) identifying a block of residual values comprised of the residual values associated with residual data locations starting at and following the residual data location to which the currently selected offset-count pair is assigned up to a limit indicated by the count value of the currently selected pair;
(f) adding the data values of the identified block of previously decoded data values in sequence to the correspondingly located values of the identified block of residual values beginning with the first value in both blocks;
(g) designating the sums as the next occurring block of recovered source data;
(h) deselecting the currently selected offset-count pair and selecting the next occurring pair;
(i) repeating steps (d) through (h) until there is no next occurring offset-count pair to select.

68. The process of claim 67 wherein the offset-count pairs are compressed in the encoded source data, and wherein prior to the step of selecting the first occurring offset-count pair, the conversion process further comprises the step decompressing the offset-count pairs.

69. The process of claim 67, wherein the predetermined constant comprises a mean of the original source data values.

70. The process of claim 67, wherein the data values of the decompressed residual data are stored in individual storage locations, and wherein the step of designating the sums as the next occurring block of recovered source data comprises the step of replacing each value of each identified block of residual data values in its storage location with the values associated with the blocks of recovered source data to reduce storage requirements.

71. A system for converting encoded source data into recovered source data that is identical to the original source data, wherein the encoded source data comprises compressed residual data, and a series of pointers with each pointer having been assigned to a unique data location of the residual data prior to the residual data being compressed and comprising an offset-count pair having an offset value defining an offset to an earlier occurring data location and a count value defining a number of data values in a block of data, said system comprising:

a general purpose computing device; and
a computer program comprising program modules executable by the computing device, wherein the computing device is directed by the program modules of the computer program to,
(a) decompress the residual data,
(b) decode the first data value of the recovered source code from the decompressed residual data by adding the first value- of the residual- data to a predetermined constant;
(c) select the first occurring offset-count pair;
(d) identify a block of data values in thee previously decoded data by, first counting back through the decoded data from the last decoded data location by the number locations indicated by the offset value of the currently selected offset-count pair to identify the first data value of the block, and then completing the block using the previously decoded data values immediately following the first value up to a limit indicated by the count value of the currently selected offset-count pair;
(e) identify a block of residual values comprised of the residual values associated with residual data locations starting at and following the residual data location to which the currently selected offset-count pair is assigned up to a limit indicated by the count valve of the currently selected pair;
(f) add the data values of the identified block of previously decoded data values in sequence to the correspondingly located values of the identified block of residual values beginning with the first value in both blocks;
(g) designate the sums as the next occurring block of recovered source data;
(h) deselect the currently selected offset-count pair and selecting the next occurring pair;
(i) repeat program modules (d) through (h) until there is no next occurring offset-count pair to select.

72. The system of claim 71, wherein the offset-count pairs are compressed in the encoded source data, and wherein prior to performing the program module for selecting the first occurring offset-count pair, the offset-count pairs are decompressed.

73. The system of claim 71, wherein the predetermined constant comprises a mean of the original source data values.

74. The system of claim 71, wherein the data values of the decompressed residual data are stored in individual storage locations, and wherein the program module for designating the sums as the next occurring block of recovered source data comprises replacing each value of each identified block of residual data values in its storage location with the values associated with the blocks of recovered source data to reduce storage requirements.

75. A computer-readable memory for converting encoded source data into recovered source data that is identical to the original source data, wherein the encoded source data comprises compressed residual data, and a series of pointers with each pointer having beer assigned to a unique data location of the residual data prior to the residual data being compressed and comprising an offset-count pair having an offset value defining an offset to an earlier occurring data location and a count value defining a number of data values in a block of data, said memory comprising:

a computer-readable storage medium; and a computer program comprising program modules stored in the storage medium, wherein the storage medium is so configured by the computer program that it causes the computer to, (a) decompress the residual data, (b) decode the first data value of the recovered source code from the decompressed residual data by adding the first value of the residual data to a predetermined constant;

(c) select the first occurring offset-count pair;

(d) identify a block of data values in the previously decoded data by, first counting back through the decoded data from the last decoded data location by the number locations indicated by the offset value of the currently selected offset-count pair to identify the first data value of the block, and then completing the block using the previously decoded data values immediately following the first value up to a limit indicated by the count value of the currently selected offset-count pair;

(e) identify a block of residual values comprised of the residual values associated with residual data locations starting at and following the residual data location to which the currently selected offset-count pair is assigned up to a limit indicated by the count value of the currently selected pair;

(f) add the data values of the identified block of previously decoded data values in sequence to the correspondingly located values of the identified block of residual values beginning with the first value in both blocks;

(g) designate the sums as the next occurring block of recovered source data;

(h) deselect the currently selected offset-count pair and selecting the next occurring pair;

(i) repeal program modules (d) through (h) until there is no next occurring offset-count pair to select.

76. The computer-readable memory of claim 75 wherein the offset-count pairs are compressed in the encoded source data, and wherein prior to performing the program module for selecting the first occurring offset-count pair, the offset-count pairs are decompressed.

77. The computer-readable memory of claim 75, wherein the predetermined constant comprises a mean of the original source data values.

78. The computer-readable memory or claim 75 wherein the data values of the decompressed residual data are stored in individual storage locations, and wherein the program module for designating the sums as the next occurring block of recovered source data comprises replacing each value of each identified block of residual data values in its storage location with the values associated with the blocks of recovered source data to reduce storage requirements.

* * * * *

UNITED STATES PATENT AND TRADEMARK OFFICE
CERTIFICATE OF CORRECTION

PATENT NO.    : 6,535,642 B1
DATED         : March 18, 2003
INVENTOR(S)   : De Bonet It is certified that error appears in the above-identified patent and that said Letters Patent is hereby corrected as shown below:

Column 12,
Line 43, "$C_2<B_2$" should be changed to -- $C_2 \leq B_2$ --

Column 13,
Line 50, "one-&value" should be changed to -- one-value --

Column 19,
Line 43, "ROM,24" should be changed to -- ROM 24 --

Column 36,
Line 17, "value-" should be changed to -- value -- and "residual-" should be changed to -- residual --
Line 20, "thee" should be changed to -- the --
Line 67, "beer" should be changed to -- been --

Signed and Sealed this

Tenth Day of June, 2003

JAMES E. ROGAN
*Director of the United States Patent and Trademark Office*